United States Patent
Mandralis et al.

(10) Patent No.: US 7,469,628 B2
(45) Date of Patent: Dec. 30, 2008

(54) DEVICE FOR PREPARING A DRINK FROM A CAPSULE BY INJECTION OF A PRESSURIZED FLUID AND CAPSULE-HOLDER ADAPTED THEREFORE

(75) Inventors: Zenon Ioannis Mandralis, Chexbres (CH); Alfred Yoakim, St-Legier-La Chiesaz (CH); Jean-Paul Denisart, La Conversion (CH); Jean-Luc Denisart, Cully (CH); Hans Peter Pleisch, Corseaux (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 11/828,774

(22) Filed: Jul. 26, 2007

(65) Prior Publication Data
US 2007/0272084 A1    Nov. 29, 2007

Related U.S. Application Data

(63) Continuation of application No. PCT/EP2006/000944, filed on Feb. 3, 2006.

(51) Int. Cl.
*A47J 31/00*    (2006.01)
(52) U.S. Cl. .......................... 99/295; 99/279
(58) Field of Classification Search ........... 99/452–455, 99/279–323, 495, 516, 536, 275–277; 426/77, 426/112, 433; 222/83.5; 137/1, 132, 142; 347/85
See application file for complete search history.

(56) References Cited

U.S. PATENT DOCUMENTS

| 3,260,190 | A   |   | 7/1966  | Levinson ............... 99/295 |
| 3,754,463 | A   | * | 8/1973  | Vernooy ............... 99/295 |
| 3,878,772 | A   | * | 4/1975  | Nordskog .............. 99/295 |
| 4,738,378 | A   | * | 4/1988  | Oakley et al. ........... 222/82 |
| 5,111,740 | A   | * | 5/1992  | Klein ................. 99/295 |
| 5,242,702 | A   | * | 9/1993  | Fond .................. 426/433 |
| 5,325,765 | A   | * | 7/1994  | Sylvan et al. ............ 99/295 |
| 6,766,817 | B2  |   | 7/2004  | da Silva ............... 137/1 |
| 6,918,404 | B2  |   | 7/2005  | Dias da Silva ......... 137/132 |
| 7,066,586 | B2  |   | 6/2006  | da Silva ............... 347/85 |
| 2003/0066431 | A1 |  | 4/2003 | Fanzutti et al. .......... 99/279 |
| 2003/0071056 | A1 |  | 4/2003 | Hale .................. 222/83 |
| 2003/0217644 | A1 |  | 11/2003 | Jarisch et al. .......... 99/179 |

FOREIGN PATENT DOCUMENTS

| EP | 1 092 376 A2 | 4/2001 |
| EP | 1 502 528 A1 | 2/2002 |
| EP | 01 440 638 A1 | 7/2004 |
| WO | WO 97/43937 | 4/1997 |
| WO | WO 03/059778 A2 | 7/2003 |
| WO | WO 2004/006740 A2 | 1/2004 |

* cited by examiner

*Primary Examiner*—Timothy F. Simone
(74) *Attorney, Agent, or Firm*—Winston & Strawn LLP

(57) ABSTRACT

Device for preparation of a drink from a food substance contained in a capsule (6) comprising a fluid supply unit (5) comprising fluid supply means (50); a capsule holder (4) configured to receive a capsule (6). The capsule holder is removable from the fluid supply unit and can comprise a fluid injector (70) for inserting fluid into the capsule.

26 Claims, 22 Drawing Sheets

DEVICE FOR PREPARING A DRINK FROM A CAPSULE BY INJECTION OF A PRESSURIZED FLUID AND CAPSULE-HOLDER ADAPTED THEREFORE

CROSS-REFERENCE TO RELATED APPLICATIONS

This application is a continuation of International application PCT/EP2006/000944 filed Feb. 3, 2006, the entire content of which is expressly incorporated herein by reference thereto.

BACKGROUND ART

The present invention relates to a device for preparing a liquid, in particular, a device using a capsule containing one or more food ingredients for the preparation of a liquid. The invention also relates to a liquid dispenser using such a device. The present invention also relates to a capsule-holder of such a device using a capsule containing one or more food ingredients for the preparation of a liquid.

The use of capsules containing a substance for preparing a cold or hot drink by extraction or mixing with a pressurized fluid inserted into the capsule, such as water, is known particularly for producing a coffee of the espresso type, filter coffee, cappuccino, latte, macchiato, tea or chocolate, and is of value, in particular, for reasons of hygiene, freshness, conservation of the ingredients and ease of use.

Different types of machines are used for preparing drinks from sealed or permeable capsules containing a substance to be extracted such as ground coffee or tea, or a substance to be dissolved or dispersed such as instant coffee, chocolate or milk or a mixture or a simple combination of these substances. In general, the fluid for the extraction or dissolving of the substance is injected into the capsule through a wall; the extract or mixture is then formed in the enclosure of the capsule and it then pours in the form of a drink through one or more orifices. The injection may be carried out by an injector which pierces a membrane of the capsule or which inserts itself into a preformed inlet orifice of a wall of the capsule. The drink pours out of the capsule when a certain pressure is reached in the enclosure of the capsule. The capsule may thus interact with means used to delay the pouring, either opening means which open a wall of the capsule, for example reliefs against an outlet membrane, or else a filtering wall situated between the enclosure and the pouring orifice.

International Patent Application WO 03/059778 relates to a capsule containing one or more ingredients which are opened by opening means engaging with means of holding back the drink under the effect of the pressure rise in the capsule. Such a capsule has amongst other advantages: i) the possibility of distributing drinks of different natures "without cross-contamination", that is to say without a first distributed drink transmitting one or more undesired characteristics, such as a taste, colour and/or odour, to a second drink distributed after the first, ii) the flexibility of designing capsules better suited to the ingredients and products to be distributed, iii) a better control and repetitivity of the extraction or mixing conditions, iv) a significant simplification of the distribution machine.

One disadvantage of the known systems of preparing drinks from a capsule arises from the fact that they are not usually designed to receive capsules of different shapes, sizes and/or requiring particular adaptations linked, for example, to the method of injecting the fluid into the capsule.

For example, a capsule containing a cappuccino mixture to be dissolved requires a larger volume, because the powdered milk that it contains takes up much more room than a capsule containing ground coffee for an espresso coffee, or else an instant coffee for a filter coffee. On the other hand, an instant coffee or tea usually requires less storage space. Also, certain soluble products, although not necessarily occupying a large volume, must nevertheless be dissolved in a gas-containing chamber of sufficient size in order to take on sufficient of this gas to create the froth. In order to reduce the packaging costs and take account of the characteristics or attributes of the drinks to be distributed (for example, a drink with froth or without froth), it is therefore preferable to design capsules whose size is suited to the ingredients contained and/or to the drinks prepared.

It is also known that the injection conditions considerably influence the quality of the drink produced. Depending on whether consideration is given to a substance originating from a grinding process or a substance to be dissolved or dispersed in a liquid such as instant coffee or a milk-based substance such as cappuccino, chocolate or other, or else a substance to be infused such as tea, the manner in which the water is delivered and circulates in the capsule may have a considerable influence on the quality of the final drink produced. The known devices are usually not designed to adapt or modify the conditions of injection according to the types of drinks to be produced.

Another disadvantage of the known devices arises from the fact that the injection means may rapidly become dirty and/or scaled and thus modify the characteristics of injection (like for example reducing the flow, increasing the pressure losses, modifying the direction of the jet, etc.) and therefore thus affect the quality and/or the attributes of the drink. These means are rarely accessible to the user. The user therefore has difficulty diagnosing the cause of the problem and consequently has difficulty remedying it.

European Patent Application EP 1 440 638 relates to a machine for the preparation of a drink using capsules; the machine comprising a first piercing element forming an inlet orifice and a second piercing element forming an outlet orifice; the orifices being formed during the use of the capsule; the two piercing elements being formed in a single removable unit. Such a configuration aims only to make the piercing elements easier to clean.

International Patent Application WO 2004/0006740 relates to a coffee machine operating with doses which comprise a support having two indentations placed side by side to receive two different doses. The indentations have annular bed-plates of different diameters, are offset in height, each corresponding to the dimensions of the flat bed-plate surface of a dose. In this case, only two different capsule volume options are available. Such a system is also relatively complex.

International Patent Application WO 97/43937 relates to an adaptator for prepacked coffee dose with a handle that defines a part of a percolating chamber suited to holding a dose of coffee; a lid associated to the dose-holder that defines a second part of the percolating chamber; the lid being suited to seal-lock with the lower part of a hot water distributor and bearing an aperture that connects the distributor to the percolating chamber. Such a principle aims at modifying the capsule-holder of a conventional hot water distributor but provides a number of disadvantages. First of all, the large fluid connection between the machine and capsule-holder poses a problem of hot residual water which can create safety issues as well as convenience problems. Secondly, the capsule holder is conceived to adapt to the water distributor via conventional closure means, such a bayonet type system, which involves a rotary mechanical tightening movement from the user. Such movement requires a certain strength of the user to be carried out and removal of the capsule holder might be difficult. Thirdly, the fluid connections of small size such as small fluid inlets for a providing high pressure water jets in the capsule-holder cannot be associated precisely and without risk of leakage. Therefore, this principle is only adapted for connecting to a large fluid outlet of boilers. Finally, the closure principle involves high torque that can affect the precision of the articulation of the lid and capsule holder. It may also affect the seal surfaces therefore providing rapid wear of the seal surfaces that needs to be compensated by more tightening.

European Patent Application EP 1 092 376 relates to an espresso coffee machine comprising a capsule-holder with handle containing the coffee powder, adapted to be operatively connected to the boiler portion of the coffee machine. This device presents the same disadvantages as the previous one.

Accordingly, there is a need for new devices that do not have such disadvantages, and these are now provided by the present invention.

SUMMARY OF THE INVENTION

The present invention comprises a capsule-holder that is removable and can adapt to a fluid supply unit while providing more versatility/freedom in the injection mode (e.g., with possibility to create high pressure jet(s)), an improved precision of the seal connection, lower risks of wear and leakage and a facilitated handling. The system of the invention that includes such a capsule holder is also better able to receive capsules of particular shapes, sizes and/or requiring particular injection configurations relating to the nature of the ingredients and/or the drinks to be produced. This makes it easier for the user to access the injection means, and to clean or descale the injection means of the device.

Another embodiment relates to a capsule-holder for connection to a fluid supply unit of a drink preparation device to prepare a drink from a food substance contained in a capsule by inserting a fluid into the capsule. This capsule-holder comprises holding means to hold the capsule, and an injection device comprising an injector for connection to the fluid supply unit and configured for transferring fluid from the supply unit into the capsule in the form of at least one jet of fluid. This capsule holder is preferably used in combination with a capsule containing a food substance for the preparation of a drink with the capsule comprising walls defining an external volume matching the housing of the capsule-holder and a lateral edge with dimensions suitable for bearing against a bearing rim of the capsule-holder.

Yet another embodiment of the invention relates to a device for preparation of different drinks from food substances contained in capsules by injection of a fluid under pressure into the capsules. This device comprises a fluid supply unit, a fluid injector, and a series of capsule-holders which are interchangeable and removable with respect to the fluid supply unit, with each capsule-holder comprising specific features of shape, size or fluid injection arrangement that distinguish each other capsule holder.

BRIEF DESCRIPTION OF THE DRAWING FIGURES

The invention will be better understood and other features and advantages will become apparent on studying the embodiments taken as non-limiting examples of the invention and illustrated in the appended figures in which.

DETAILED DESCRIPTION OF THE PREFERRED EMBODIMENTS

Figure 1:
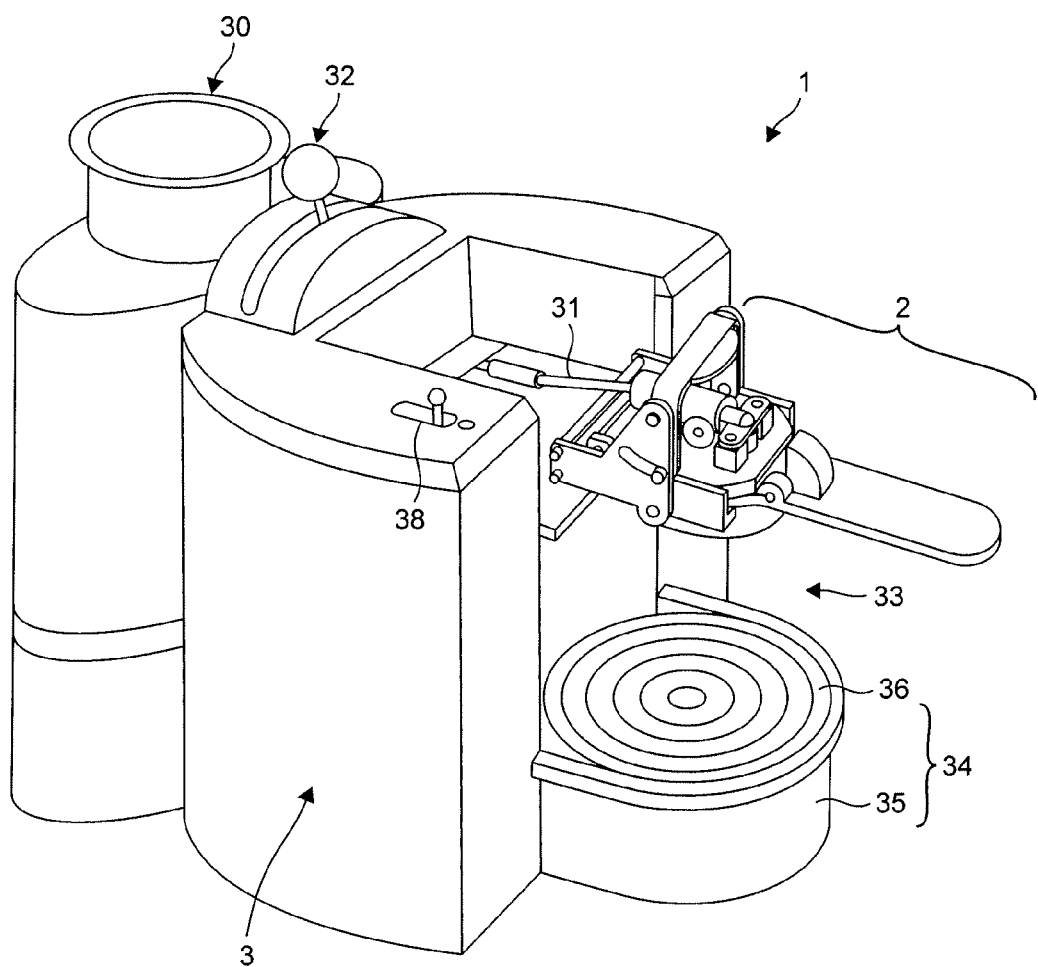
FIG. 1 represents a view in perspective of a distributor comprising a preparation device according to the invention.

In a preferred embodiment, the invention relates to a device for preparation of a drink from a food substance contained in a capsule comprising a fluid supply unit comprising fluid supply means and a capsule holder configured to receive a capsule; wherein the capsule holder is removable from the fluid supply unit. The device preferably comprises complementary engaging means of the fluid supply unit and capsule-holder. The complementary engaging means are preferably configured to enable insertion of the capsule-holder in the fluid supply unit along a first direction of insertion in which the capsule-holder is prepositioned in the fluid supply unit in a reference position while the fluid supply means are relatively distant from the capsule holder. The fluid supply unit further preferably comprises closing means configured to move the fluid supply means relatively closer to the capsule holder in a manner so that the fluid supply means becomes positioned in the fluid distribution position to be capable of distributing fluid in the capsule.

In this device, an advantageous combination is to have the fluid supply means as a fluid injector; the closing means comprising a base member that is operatively associated with the fluid injector; and the complementary engaging means comprising one or more guiding members for directing the base member into position above the capsule holder.

In a more particular embodiment, the closing means of the fluid supply unit are configured to bring the fluid supply means closer to the capsule holder in a direction that is distinct from the first direction of insertion of the capsule holder in the reference position. Advantageously, the first direction of insertion is linear.

In a preferred mode, the complementary engaging means are formed of a complementary set of guiding edges and guiding ribs enabling the insertion of the capsule-holder by sliding it in the fluid supply unit. The insertion by sliding is easy for the user to accomplish, reliable and does not require any particular force.

According to one preferential mode, the closing means are configured to bring the fluid supply means relatively closer to the capsule holder in fluid distributing position by effect of a force carried out on the capsule holder, preferably, by effect of force executed downwards.

More particularly, the fluid supply unit can comprise a guide base in which the capsule holder is inserted in by sliding movement along the guiding edges. A fluid supply base is also provided as part of the fluid supply unit that supports the fluid supply means. The fluid supply base comprises a fluid outlet. The fluid supply base is articulated and mobile relative to the guide base from the distant position to the fluid distribution position of the fluid supply means in the capsule.

More precisely, the fluid supply base is articulated to the guide base by a toggle joint system so that a pressure on the capsule holder in a preferred direction distinct from the insertion direction causes the supply base to close relative to the guide base in the fluid distribution position.

In order to facilitate injection of fluid within the capsule, the capsule holder comprises a fluid injector for inserting fluid within the capsule. The fluid injector is preferred but could be omitted depending on the type of capsule to be inserted in the capsule holder.

It will be understood that, in the context of the invention, the term "capsule" means a discardable or recyclable package, container, sachet or receptacle that contains one or more ingredients and is flexible, partially rigid or totally rigid.

The term "drink" is intended in the broad sense as including any type of hot or cold liquid food preparation.

According to another aspect, the invention relates to a device for the preparation of a drink from a capsule by injection of a pressurized fluid into the capsule comprising a fluid supply unit and an injector of fluid into the capsule; characterized in that the injector is separable from the fluid supply unit and in that the device comprises a capsule-holder configured to receive a capsule and in that the capsule-holder is removable from the supply unit.

Thus, by designing a capsule-holder that can be removed from the pressurized fluid supply unit, it is possible to conceive of changes or variations in the capsule-holder itself, as in the compatibility of the shape and/or size of the capsule and the capsule-holder and/or in the injection means or, where appropriate, still other possible functional interactions between the capsule and the capsule-holder.

"Separable" means that the injector can be separated from the supply unit when the capsule-holder is disengaged from the supply unit. The separation may be carried out either as a result of the very action of separating the capsule-holder from the supply unit, or manually by acting on the injector itself.

The capsule according to the invention may contain one or more ingredients suitable for the production of a drink. The drink may be for example a coffee, tea, chocolate or a milk-based liquid and combinations thereof or sauce, stock or soup or other nutritional liquids. The ingredients may be in the form of powder, grounds, infusion, liquid or gel or else a combination of these forms of ingredients.

In one aspect of the invention, the injector comprises at least one injection orifice to inject at least one jet of fluid into the capsule. The injector may take varying forms depending on the desired mode of injection.

In certain cases, the injector may comprise a perforation means which may be one or more pointed elements, or blades, or other sharp, cutting or tearing elements, configured to act on a rigid, semi-rigid or flexible wall of the capsule in order to create one or more ports of entry into the capsule for the insertion of at least one orifice for injection of fluid from the injector. In other cases the injector comprises a fluid manifold made in a wall; the manifold leads to one or more injection orifices.

The injector is chosen according to the desired injection conditions, when, for example, a different drink is required, either from one and the same capsule or from a different capsule.

For example, one injector may be used to produce a properly directed, high speed jet into the enclosure of the capsule, in order to provide turbulence when the capsule contains ingredients to be dissolved and/or else to form a frothy drink. On the other hand, another injector may be used, for example, that is configured to produce a more diffuse fluid distribution and at a slower output speed, for example, when the capsule contains a bed of grounds such as ground coffee in order to thoroughly wet the ingredients and produce a coffee of the espresso type or filter coffee.

In a first embodiment, the injector forms part of, or is fitted to, the capsule-holder. Thus, when the capsule-holder is separated from the fluid supply unit, the injector is as a result also separated from the fluid supply unit. This has several additional advantages. The injector may thus be perfectly suited to the particular type of capsule-holder, therefore to a type of capsule capable of being received in the capsule-holder, without the user having to worry which injector to use for a given capsule-holder or capsule. In other words, this offers the possibility of combining a suitable pair: a capsule-holder and an injector, depending on the drink to be produced.

For example, a capsule containing a product to be dissolved, such as a mixture of coffee powder or powered milk to produce a cappuccino, requires a large size capsule-holder housing and an injector producing a directed and high-speed jet. A capsule containing a product to be extracted such as a ground coffee, to produce an espresso or filter coffee, requires a smaller capsule-holder volume and an injector producing one or several more diffuse and slower jets. The possibilities offered for configuring the capsule-holder/injector are therefore varied and naturally depend on the characteristics sought for the drinks to be produced.

In another embodiment, the injector forms part of, or is fitted to, the fluid supply unit. In this case, the injector may be directly associated with the supply unit. Only the advantages of the flexibility offered by the possible changes or interchangeability of the capsule-holder are then obtained. However, such an embodiment has the advantage of a simpler design of the capsule-holder. It also reduces the possible disadvantages or small risks linked to the operation of the injector, such as the risks of receiving pricks or other minor accidental wounds.

The injector is preferably configurable on the capsule-holder in a reference position relative to the capsule that corresponds to the position of injection into the capsule. Thus, the injector can be configured on the capsule-holder in a reference position relative to the capsule that corresponds to the position of injection. Thus, there is the assurance that the injector is in the correct position relative to the capsule itself. Thus, the user does not have to worry about the correct way of placing the injector relative to the capsule. Positioning means are then provided to place the injector in the injection position, before or during the linkage between the capsule-holder and the fluid supply means. This prevents any risk of an incorrect association between the injector and the supply unit when the capsule-holder and the supply unit are assembled to prepare a drink.

More particularly, according to one possible aspect, the injector forms part of an injection system on the capsule-holder which renders it mobile between a disengaged position and a position of injection into the capsule. In the disengaged position of the injector, a capsule may be freely positioned in the capsule-holder. Then, the injector may move into the injection position. In particular, in the injection position, the piercing means is engaged in piercing the capsule and the injection orifice is then correctly inserted and placed in the capsule enclosure.

In one possible embodiment, the injection system comprises
an injector support piece which is mounted in rotation on the edge of the capsule-holder housing;
an elastic means which keeps the support piece in the injection position;
an actuation means to move the support piece and the injector into the disengaged position against the action of the elastic means.

Thus, the injector is automatically placed in the injection position after a capsule has been placed in the capsule-holder—that is to say, when the actuation means is released—so that the elastic means forces the support piece to place the injector in the injection position against the capsule. For example, the system and its elastic means are configured to bend, by the return force created, the support piece of the injector against the surface of the capsule to be pierced, thus obliging the injector to pierce the surface.

As for the injector, it is usually connected in sealed manner to the fluid supply unit by relative movement of at least a part of the supply unit and the injector. The supply unit comprises a fluid outlet portion which then engages by pressing against a fluid inlet portion of the injector. The connection is therefore preferably made by simple free connection and by the force of contact between the supply unit and the injector. The connection can also be a mechanical clipping that engages and disengages by mechanical pressure between the supply unit and the injector. Such connections therefore considerably simplify the device. They also render the injector automatically separable from the unit as soon as the force of contact or pressure is relaxed or a simple opposite reopening force is applied (in the case of mechanical clipping for example); that is to say when, in a general manner, the removable capsule-holder is simply separated from the supply unit for example when a used capsule is replaced by a new capsule.

In an advantageous example, the injector comprises a substantially frustoconical inlet portion and the fluid supply unit comprises a complementary substantially frustoconical fluid outlet portion which engages against the fluid inlet portion of the injector. This therefore provides a free connection of the cone-on-cone type without an additional connection means. The inlet portion of the injector can be in relief and the outlet portion of the fluid outlet can be in recess or conversely. An additional sealing means may be used such as one or more seals, such as an O-ring or other means. Other surface arrangements may however be envisaged within the capabilities of those skilled in the art without departing from the scope of the invention.

According to one aspect of the invention, the capsule-holder comprises an elongated element forming a handle. As a result, the manual insertion of the capsule-holder into the fluid supply unit is easier.

Thus, according to one possible embodiment, the capsule-holder and the supply unit comprise additional means of engagement allowing the capsule-holder to be prepositioned in the supply unit in a configuration in which the injector is placed in a reference position relative to the fluid supply means of the supply unit. This propositioning can be used to configure the actual reference position of the injector by reference to the supply means against which it is planned to be attached. The supply means are also moved to carry out the association of the supply means with the injector itself.

More particularly, the supply unit comprises a guide base in which the capsule-holder interacts in insertion up to the reference position of the fluid supply means;
a fluid supply base comprising a fluid outlet connector configured to associate itself in connection with a complementary connector of the injector;
the supply base being mobile relative to the guide base from a disengaged position of the connectors to an engaged sealing position of the connectors. Such a configuration of the unit in two distinct parts, a supply base and a guide base, has the advantage of making it easier to position the capsule-holder in two stages; a first stage for the insertion by sliding the capsule-holder up to the correct prepositioning of the injector, a second stage for associating the supply means with the injector once the capsule-holder and the injector are in the reference position. These two stages are easy for an averagely careful user to carry out.

According to a particular embodiment, the fluid supply base of the supply unit is thus articulated to the guide base by toggle joint system, so that a pressure in a preferred direction distinct from the capsule-holder insertion direction established on the capsule-holder causes the supply base to close relative to the guide base in the engaged position of the connectors and therefore causes the supply unit to close against the capsule-holder. The means employed, particularly latching means, to cause the supply base to close against the capsule-holder are reliable in use. They provide an accurate and repetitive engagement of the various pieces over a large number of cycles.

According to one aspect, the invention thus relates to a capsule-holder, as such, intended to be connected to a fluid supply unit of a drink preparation device to prepare a drink from a food substance contained in a capsule by inserting a fluid into the capsule, the capsule-holder comprising holding means such as a cup to receive a capsule; the capsule-holder comprising an injection device furnished with an injector capable of being connected to the fluid supply unit and configured for transferring this fluid from the supply unit into the capsule in the form of at least one jet of fluid.

In a general manner, the injector comprises a fluid inlet orifice, an injection duct and at least one injection orifice for injecting at least one pressurized jet of fluid into the capsule.

In one aspect of the invention, the seal bearing surface occupies a limited surface area directly above the housing and smaller than the larger surface area of the housing. This configuration provides several advantages. Firstly, the sealing forces between the injector and the fluid supply device are concentrated on a smaller surface area therefore increasing the overall sealing pressure (or requiring a lower mechanical force for a same sealing pressure). An increase of the sealing pressure offers a higher resistance to the inside pressure of the fluid; therefore, less risk of fluid leakage in this fluidic connection zone. Therefore, a more efficient water tightness within an elevated fluid pressure range can be achieved. Secondly, the fluid connection between the capsule-holder and the fluid supply unit can be made by a simple application of compressive forces and without attachment. Therefore, fluid connection is simpler, more accurate and remains reliable over time. Therefore, the coupling of the capsule holder and the fluid supply unit of the machine is simpler and more reliable.

For instance, the external diameter (i.e., diameter of the circular line delimiting the outer contour) of the seal bearing surface can be at least three or even 4 to 20 times smaller, than the larger diameter of the housing. The external diameter of the seal bearing surface can be of a diameter less than 2 cm, preferably of between 0.5 and 1.5 cm. The seal bearing surface can surround a fluid inlet orifice of very small size, for instance, less than 2 mm, preferably of from about 1 to 1.5 mm.

The bearing surface can be substantially frustoconical. This frustoconical surface may have a rectilinear or curved (convex or concave) generatrix.

In one advantageous configuration of the invention, the seal bearing surface surrounds the fluid inlet orifice and both the seal bearing surface and fluid inlet orifice are placed substantially off-centered above the housing. The distance between the orifice and the centre of the housing can be of from about 1 to 3 cm, preferably of about 1.5 to 2 cm. This configuration also provides several advantages. One advantage is that dissolution by the injector's jet(s) when off-centered is more effective on certain food substance, in particular powders such as fat based powder. This creates turbulence in the substance bed and turn the substance over until its full dissolution. A second advantage is that fluid-tight connection can be achieved efficiently while involving a lower momentum of force on the capsule-holder. Therefore, the capsule holder is more robust with less risk of breakage.

The injection device comprises a support piece or a cover, partially or totally covering the cup, on which the injector is mounted. The support piece or the cover is mobile relative to the cup so that the injector can be moved out of the cup housing and thus the cup can be loaded with a capsule. The injection device thus moves the injector from a position of injection into the capsule to a retracted position allowing the capsule to be placed in the housing. In the engagement position, the injector is preferably off-centre in the housing. Such a position favours a swirling movement of the fluid in the capsule. This position also makes it possible to make a smaller injector support piece, partially covering the housing and therefore less of a lever effect which gives a greater pressure of the injector against the capsule for a better injection seal, if necessary, a more effective perforation of the capsule wall.

The injector comprises at least one sealed bearing surface intended to come to bear against a fluid supply duct of the supply unit. The bearing surface is substantially frustoconical either as a relief or a recess. This frustoconical surface may have a rectilinear or curved (convex or concave) generatrix.

According to one embodiment, the injector comprises at least one nozzle which is inserted into the capsule and at the end of which the injection orifice is placed.

The nozzle preferably has a portion of perforation or of cut-away to form at least one perforation or cut-away in an inlet wall of the capsule to allow it to be inserted. The nozzle may also be non-perforating and be inserted into a preformed orifice of the capsule wall.

According to an alternative, the injector comprises a simple connector (instead of the nozzle) terminating in the injection orifice and which is simply arranged against an orifice of the capsule wall.

The nozzle or the connector has a sealing means configured between the nozzle and the perforation or cut-away of the capsule wall, when the injector is in the position of injection into the capsule.

The sealing means at the base of the nozzle or of the connector provides the seal between the nozzle or connector and the wall of the capsule so that the pressurized fluid in the capsule cannot come out between the injector and the injection orifice in the capsule. For instance, the sealing means can be an elastic seal element. The element can be a rubber or soft plastic pad. The sealing means can also be a rigid stepped portion around the base of the part of the injector that inserts itself in the capsule; the portion being effective to provide an impression on the surface of the capsule. The stepped portion can be made of rigid plastic which is integral with the support of the injector. In this mode, the fluid tightness is produced by the upper foil of the capsule that deforms sufficiently against the stepped portion. Therefore, instead of the sealing means deforming, the capsule's surface can be formed to produce the sealing function.

In one embodiment, the injection device comprises a support piece which supports the injector and partially covers the cup. In one embodiment, the support piece is itself mounted pivotably on the edge of the cup. An elastic return means keeps the support piece and its injector in contact with the inlet wall of the capsule. In this way, the seal is better preserved when the capsule-holder is removed from the supply unit since the injector is sure of remaining in contact with the capsule.

The injector also comprises a means of blocking the duct. This blocking means, in combination with the sealing element, serves to keep the capsule wall sealed off from the air when the capsule-holder is separated from the fluid supply unit. This prevents air entering the capsule, and therefore prevents liquid trickling to the bottom of the capsule. In certain cases, when a residual pressure remains high, as with ground coffee, this also prevents a pressurized liquid return effect outside the injector, at the time when the capsule-holder is separated from the fluid supply unit.

A blocking means is for example a valve. Such a valve is configured to open, in the direction of injection, under the effect of the injection of the fluid in the injector and to close as soon as the injection stops. The closure of the valve may be activated by an elastic element and/or by the effect of the residual pressure in the capsule. Such a valve may be a ball or needle valve, an iris valve or an equivalent means.

Another means of closure is, for example, a portion of duct of small cross section causing a retention of liquid by capillary attraction. The capillary attraction portion of duct preferably has a diameter of less than 1 mm, preferably less than 0.7 mm. The capillary attraction portion also preferably has a length of at least 1 mm and less than 3 mm. A greater length creates too great a pressure loss, therefore an insufficient pressure in the capsule. Too short a length is insufficient to cause the desired effect of blocking the duct.

The injector duct may advantageously be rectilinear to make the latter easier to maintain. It is then oriented vertically towards the bottom of the cup. Because of the small cross section of the duct, a pressurized jet effect is produced in the capsule with a powerful mixing effect, which promotes the dissolving of the soluble substances.

In other possible embodiments, the duct has a succession of rectilinear portions making between them a non-zero angle of inclination. In this case, the duct terminates in a portion oriented at a non-zero angle relative to the vertical axis of the cup and offset relative to the centre of the cup. Such an orientation favours a vortex effect in the capsule for a better dissolving of the soluble material contained in the capsule.

In other possible embodiments, the injection device comprises an injection wall or a cover entirely covering the cup. Such a configuration may be useful for several reasons. On the one hand, the injection of the fluid may be better distributed in the capsule. On the other hand, the wall or cover may maintain a pressure against the sealing edges of the capsule, which prevents the latter from delaminating when the pressure in the capsule reaches high values. The wall may also provide the seal to the injection fluid between the bottom surface of the cover and the top face of the capsule, by the sealing pressure of a clamping edge of the cover against an edge of the capsule and on the edge of the cup, the edge of the capsule then being sandwiched between the two clamping edges. In this case, it is necessary to provide a seal which presses either on the peripheral clamping edge of the cup or on the clamping edge of the cover.

The invention also relates to a drinks distributor comprising a device as previously defined.

With reference to FIG. 1, a preferred embodiment of a drink distributor or distribution machine 1 is illustrated in perspective which comprises a preparation device or module 2 according to the invention. The device will be described in greater detail in the rest of the present description. It is connected to a frame 3 of the machine which comprises a water supply system, known per se, configured to supply the device with water under pressure comprising a water reservoir 30, such as a transparent jar, a pump and a water heater (not visible) inside the frame, a water inlet duct 31 connecting the pump and the water heater to the device 2. The inlet of water into the device is controlled by an actuation system 32 comprising, for example, as known per se, a valve and a manually actuatable lever. Any other actuation system may be envisaged such as a stop button associated with an electromechanical valve. A main electricity supply control 38 is provided on the frame which is used to power up the machine and, for example, to begin if necessary the preheating of the water heater to preheat a volume of water.

Usually the distribution machine has a distribution zone 33 suitable for receiving a receptacle. The zone extends vertically between the preparation device 2 and a receptacle support 34 furnished for example with a drip tray 35 and a drain grid 36, both removable from the frame for cleaning.

The device or module itself for preparation from a capsule will now be described with reference to FIGS. 2 to 11.

Figure 2:
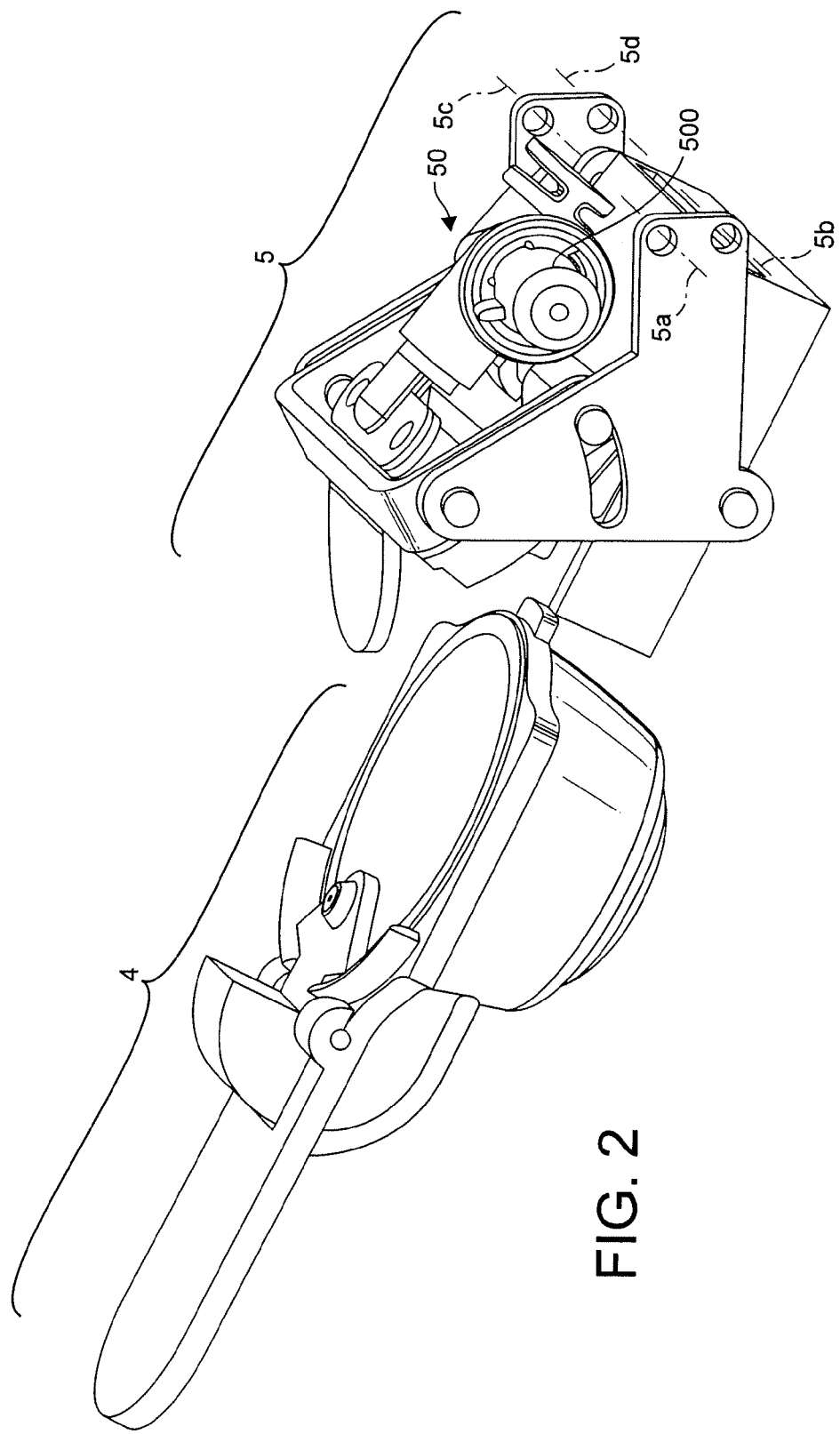
FIG. 2 shows a view in perspective of the preparation device before insertion of the capsule-holder into the fluid supply unit.

The preparation device 2, as shown in FIG. 2, comprises, on the one hand, a capsule-holder 4 and, on the other hand, a pressurized fluid supply unit 5. According to an important aspect of the invention, the capsule-holder 4 is configured to be associated with the supply unit in removable manner according to the complementary engagement means that will be described in greater detail hereinafter. The supply unit 5 is, for its part, attached to the frame of the machine both mechanically and in fluid communication. More precisely, the supply unit 5 is attached by mechanical connection means such as screws or other means, through connection axes 5a-5d. The unit communicates with the pump and the water heater via the duct 31 which is connected to the fluid connector 50 positioned above the unit. The fluid connector 50 may also comprise a back pressure valve 500 which keeps the duct closed below a minimal hydraulic pressure upstream of the valve.

Figure 3:
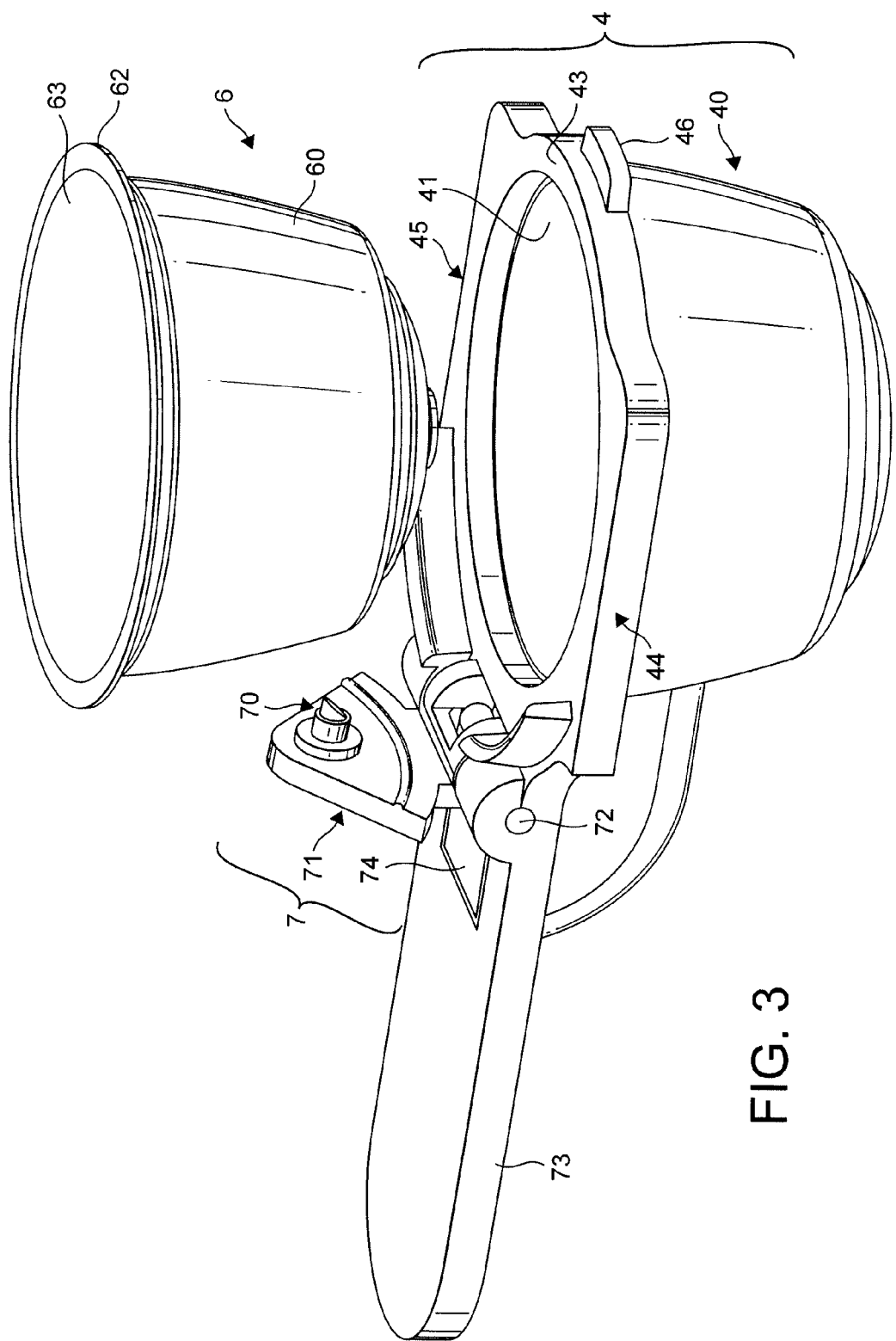
FIG. 3 shows a view in perspective of the capsule-holder itself and of a capsule when it is placed in the capsule-holder.
Figure 4:
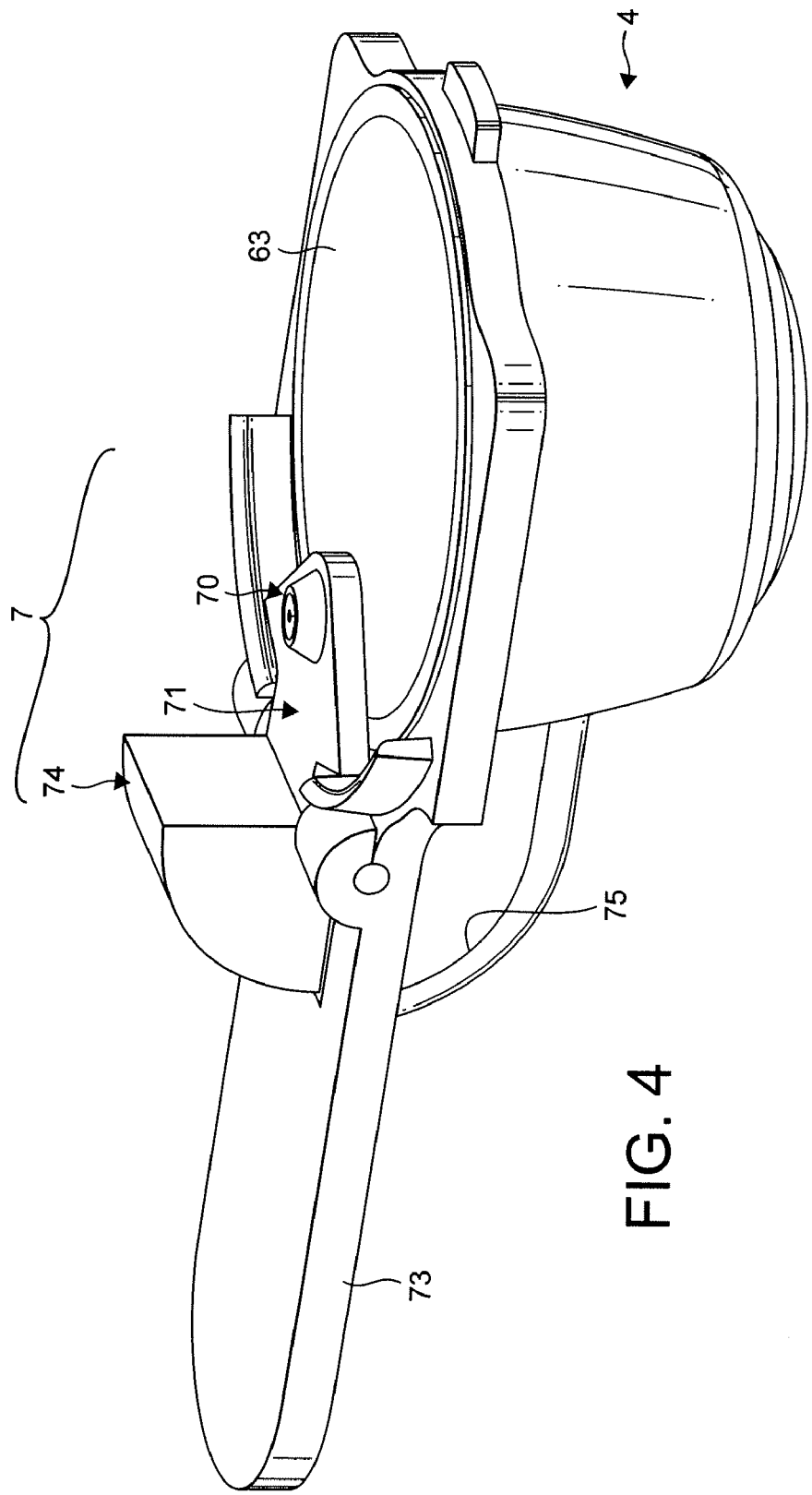
FIG. 4 shows a view in perspective of the capsule-holder and of a capsule placed in the capsule-holder.
Figure 5:
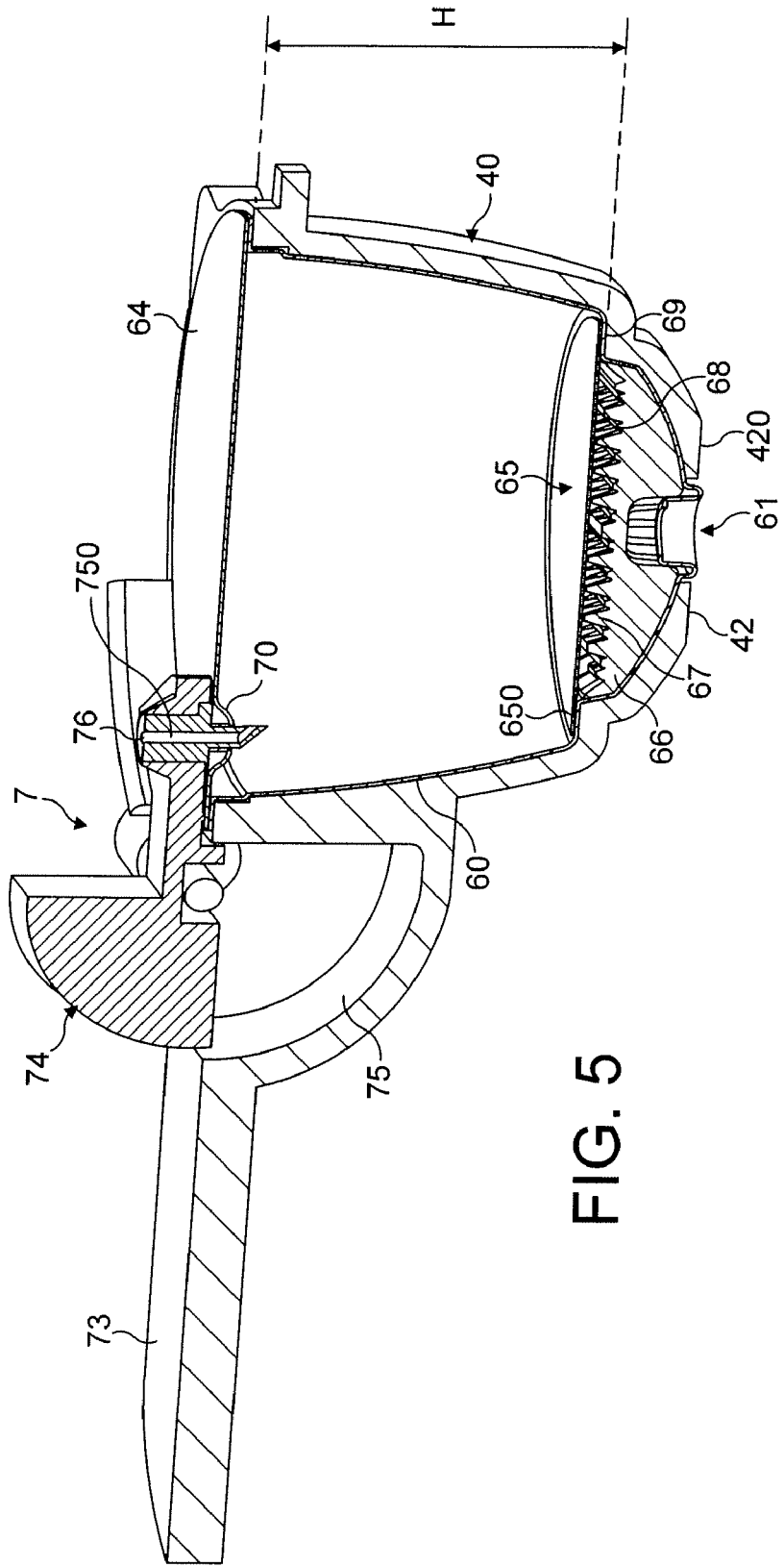
FIG. 5 shows a view in longitudinal section of the capsule-holder of FIG. 4.

The capsule-holder 4, with reference to FIGS. 3 to 5, is configured to receive a capsule 6. For this, the capsule-holder is furnished with a cup 40 with walls furnished with internal surfaces that preferably espouse the general shape of the capsule. The matching of the capsule-holder to the shape of the capsule is visible in FIG. 5. Thus, a capsule body 60 comprises external surfaces that complement the internal surfaces or housing 41 of the cup. Thus, a type of capsule to deliver a particular drink may be associated with a capsule-holder of matching configuration. It is therefore easy, by modifying the size and/or the shape of the cup, to reject a capsule in the capsule-holder which is not then intended for such a capsule-holder. This can be used to control the standards, the features and/or the quality of the distributed products.

It can also be noted that the cup itself could be removed if the body 60 of the capsule is sufficiently rigid, in which case, the capsule can be simply held on the upper edge of the capsule-holder. For instance, the holding means could so become a support ring that bears the upper edge of the capsule.

The cup of the capsule-holder ends towards the bottom in a discharge opening 42 furnished with edges 420 configured to clear a pouring orifice 61 of the capsule. Preferably, this opening is configured in size to prevent its edges 420 from being soiled by the drink which flows through the capsule; this limits cleaning and reduces the risks of cross-contamination between two drinks. Furthermore, the pouring orifice 61 extends preferably downwards substantially beyond the edges 420 of the cup so as to reduce the risk of the liquid contacting these edges. For this, the edges 420 may also be thinner than the walls of the rest of the cup 40.

As shown in FIG. 3, the cup extends upwards via bearing edges 43 allowing the capsule 6 to rest by means of its lateral edges 62. The capsule is thus held in the capsule-holder in a stable position with a transverse fluid inlet wall 63, unencumbered (not covered) towards the top. The wall may be a membrane sealed on the edges for example or a semi-rigid wall connected to the body by other means. As an indication, the walls of the body 60 are typically made of a plastic material chosen from the set comprising EVOH, PVDC, PP, PE, PA in single- or multi-layer form. The body 60 is hermetically sealed by the fluid inlet wall 63, for example, by means of a lid that is heat-sealed onto the edges of the body 60. The lid is typically made of a material capable of being perforated by perforation means, in particular an injector, which will be described hereinafter. The material of the lid 63 may for example be chosen from the set comprising aluminium, an aluminium/polymer composite, cellulose/aluminium/polymer, a single-layer or multi-layer polymer.

In the example shown, it will be noted that the capsule 6 preferably has its own opening means configured to allow the drink to pass through the pouring orifice 61 in a configuration in which the capsule is pressurized by the fluid injected into the latter. Thus, as shown in FIG. 5, the capsule comprises in its bottom part a thin film 65 sealed on an inner edge 650 of the body 60 of the capsule. This film 64 is placed above a disc 66 comprising a plurality of elements in relief 67 spaced out on the surface of the disc and delimiting a plurality of channels 68 emerging at the periphery of the disc. For a more detailed description of the capsule 6, the entire content of International Patent Application WO 03/059778 filed on 13 Jan. 2003 is incorporated herein by reference.

According to one aspect of the invention, the capsule-holder 4 and an injector 70 intended to inject the fluid under pressure into the capsule are linked together. The injector may form part of the capsule-holder or be fitted in separable manner thereto. In the preferred example illustrated in FIG. 3, the injector is the piece 70 which forms part of an injection system 7 comprising a support piece 71 of the injector 70 mounted rotatably on a side of the peripheral edge of the cup 40. The piece 71 is mounted rotatably along the axis of articulation 72 connected to the side of the cup. The side on which the support piece 71 is mounted is preferably that which comprises a handle 73 to facilitate both the grasping of the capsule-holder and the handling of the injection system on disengagement. The support piece 71 may thus be moved into a disengaged position in which the injector 70 is disengaged from the opening of the cup (FIG. 3) to allow the insertion of a capsule into the cup. Then, the support piece is rotated into a position of engagement in which the injector engages in perforation of the capsule inlet wall (FIG. 4).

The injection system 7 has an elastic means such as at least one spring (not shown) and an actuation means 74 to move the support piece 71 and the injector that is fixedly attached to it against the force of the elastic means into the disengaged position to allow the insertion of the capsule. The actuation means 74 may be a pawl which is manipulated with the thumb and engages in a recess 75 of the front part of the handle 73. Thus, when the pawl is not pushed down, the injection system is in the engagement position without the risk of the user being pricked.

As shown in FIG. 3, the capsule-holder has lateral guide edges 44, 45 in the shape of rectilinear ribs extending, on the one hand, outwards and, on the other hand, in the direction of insertion of the capsule-holder into the supply unit. These edges extend along the opening of the cup 40 in order to provide a good seat for the capsule-holder in the insertion unit. On the front side of the capsule-holder there may also be provided a shape recognition element or key 46 intended to engage in a complementary shape of the supply unit.

Figure 6:
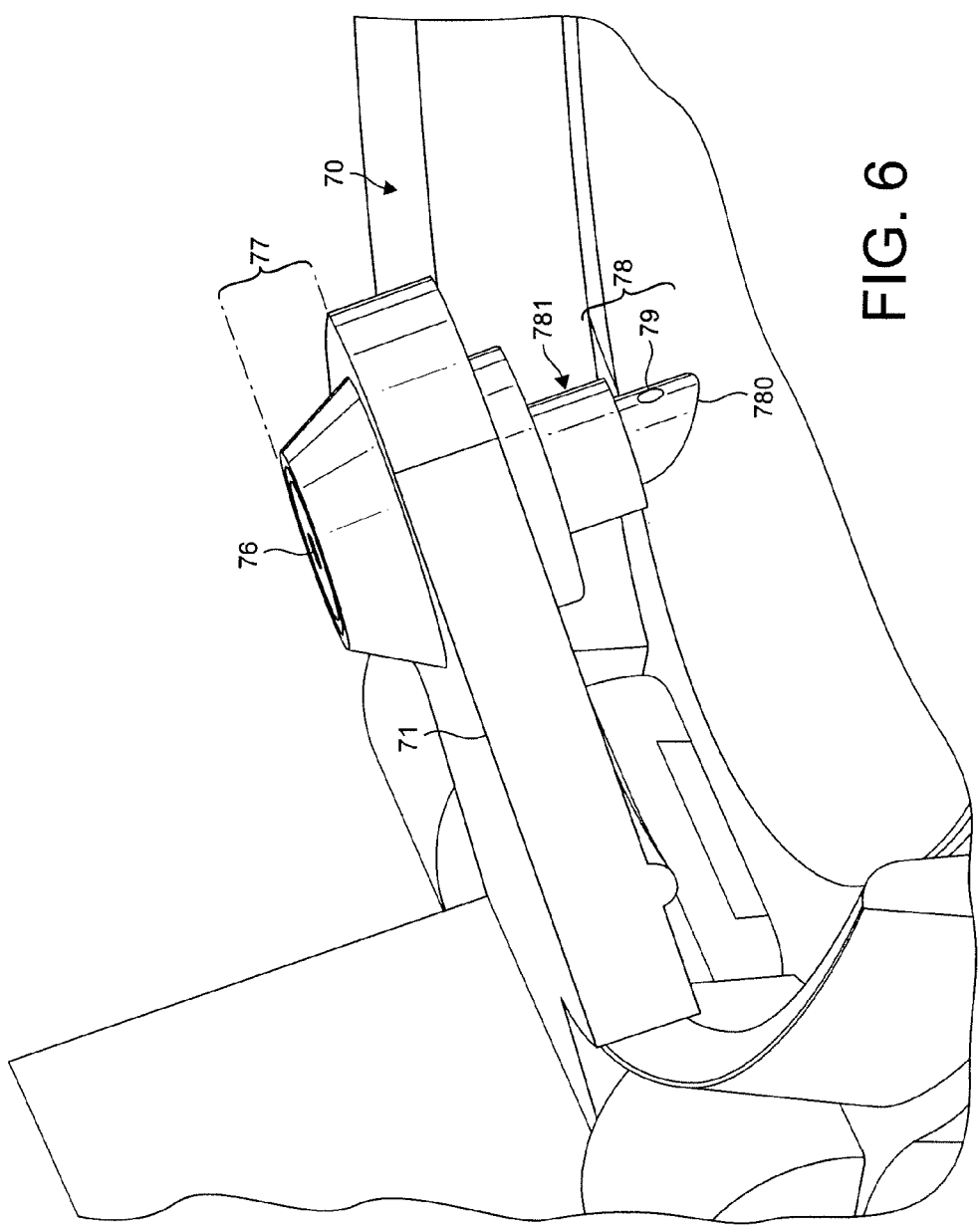
FIG. 6 shows a detail view of the capsule-holder injector.

One example of an injector is described with reference to FIGS. 3, 5 and 6. The injector comprises an inlet orifice 76 formed on the anterior face of an inlet portion or connector 77. The inlet orifice should remain relatively small, preferably of less than 3 mm in diameter. A small orifice ensures a more precise, reliable, safer fluid connection and participates to diminish hot residual water when the capsule-holder is removed. The inlet portion or connector 77 extends in relief over the top edge of the support piece 71 and is preferably frustoconical in shape. At its opposite part, the injector 70 is extended by a perforation portion 78 which ends in a blade or cutting surface 780 allowing the portion to be inserted by perforation through the inlet wall 63 and inside the capsule. The portion also comprises one or more fluid outlet orifices 79 which are oriented in a manner suitable for distributing the fluid inside the capsule in one or more appropriate directions as shown in FIGS. 5 and 6. The inlet orifice 76 and the outlet orifice 79 are connected by an internal duct 750 which traverses the injector in the axial direction.

The internal duct of the injector may be dimensioned so that a capillary effect is generated to keep the fluid in the duct when the fluid pressure is stopped. The advantage is to prevent the capsule from dripping when the capsule-holder is separated from the supply unit after extraction. The fluid is thus kept in the duct by capillary attraction, which, in combination with the seal created between the injector and the capsule surface, prevents the air from entering the capsule and therefore prevents the fluid still contained in the capsule from pouring through the pouring orifice 61 of the capsule. The duct preferably has a diameter of 0.7 mm or less, preferably lying between 0.4 and 0.6 mm and has a length of at least one 1 mm, preferably, at least 2 mm.

For soluble products, the point of injection and the direction of injection are preferably arranged at a distance from the centre of the capsule or of the cup 40 and the axis of the fluid outlet orifice is preferably oriented in a direction which passes away from the centre of the capsule or the cup 40. There are several advantages. One of them is that the connection arrangement between the capsule-holder and fluid supply means can be applied with more comparatively strength without risking breakage or deformation of the injection part of the capsule-holder (as compared to a centered positioning of the capsule-holder). Another advantage is that a vortex effect can be obtained which promotes the dissolving of the soluble ingredients inside the capsule. It should be noted that the injection orifice could be oriented differently. For example, the injection orifice 79 could be in the same axis as the rectilinear duct 750. Such a configuration of the orifice 79 in the extension of the duct 750 may be advantageous for making the duct easier to clean, in the case of blocking or scaling, with a simple needle or other means.

The injector also comprises a sealed portion 781 which forms a zone of greater cross section than the perforation portion 78 which is adjacent to it. The sealing portion can be made of softer material than the perforation material to serve as an external seal around the perforation made in the inlet wall 63 of the capsule. This may be an elastomer or silicone ring for example. The advantage of such a device is that the seal is made on a small circumference around the perforation with the portion 781 which presses on the wall of the capsule sufficiently to provide this seal; this greatly simplifies the general design of the fluid supply in the capsule. The seal thus produced around the perforation of the capsule is maintained when the capsule-holder is separated from the fluid supply unit; this has the effect, in combination with appropriate means provided in the injector to keep fluid in the injector and thus prevent the inlet of air, of preventing the capsule from dripping when the latter still contains a quantity of fluid. Appropriate means may be a capillary duct inside the injector or else an anti-return valve which closes the inlet of the duct such as a slot valve, ball valve or needle valve.

The structure of the supply unit will now be described with reference to FIGS. 7 to 10. The supply unit comprises a main guide and reception base 51 intended to receive the capsule-holder 4 in the unit—a position in which the injector is placed with reference to the fluid supply means of the supply unit. The supply unit thus has a second part called the supply base 52 which actually supports the fluid supply means. The guide base 51 and the supply base 52 are mounted articulated relative to one another so that the supply base and the guide base may adopt at least two relative positions: a position of disengagement between the injector 70 and the fluid supply means in which the fluid supply means is distant above the capsule-holder (particularly, above the injector) and a position of engagement between the injector 70 and the fluid supply means.

The guide base 51 is formed, more precisely, of a guide element in a transverse U-shape, 53, whose lateral sides have longitudinal guide ribs 530, 531 complementing the guide edges 44, 45 of the capsule-holder. The guide element 53 terminates in a posterior transverse wall 532 serving as an abutment to the capsule-holder in its insertion position. A bolt-shaped housing 533 to receive the key 46 ensures the definite correct engagement of the capsule-holder in the reference position.

The guide base and the supply base are articulated, on the one hand, by an articulation shaft 86 situated behind the bases and, on the other hand, by a latching system (i.e., toggle joint system) 8 which comprises two wings 80, 81, mounted fixedly at the rear onto the frame via the articulation shafts 5a-5c. The guide base 51 is thus mounted on the side wings 80, 81 by two side articulation shafts 800 allowing the guide base to pivot relative to the wings fixed to the frame. The fluid supply base is also connected to each side of the wings by two articulations 82 guided into two arced oblong guide openings 83 made in the wings 80, 81 of the latching system.

Figure 7:
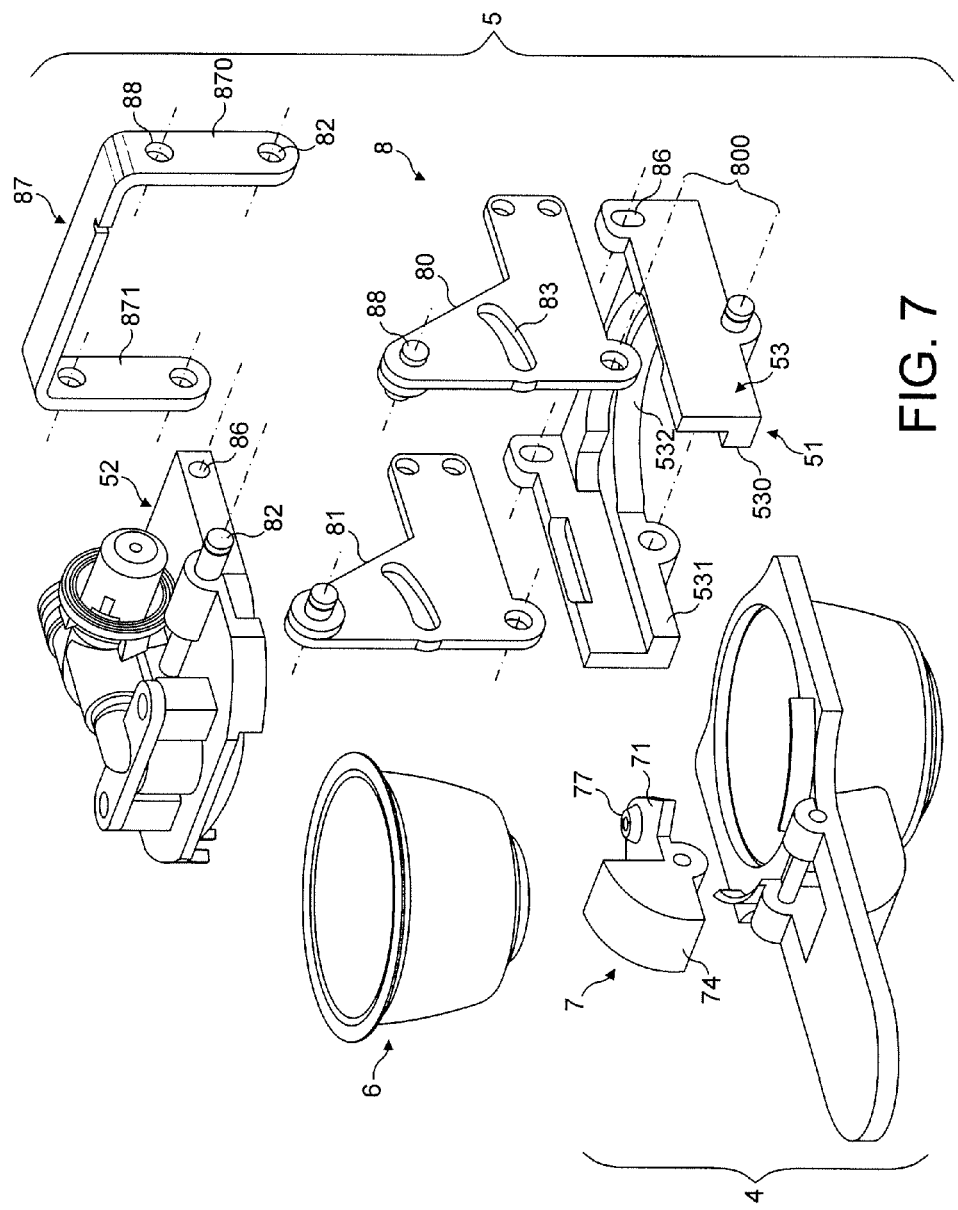
FIG. 7 shows an exploded view of the device of the invention.
Figure 10:
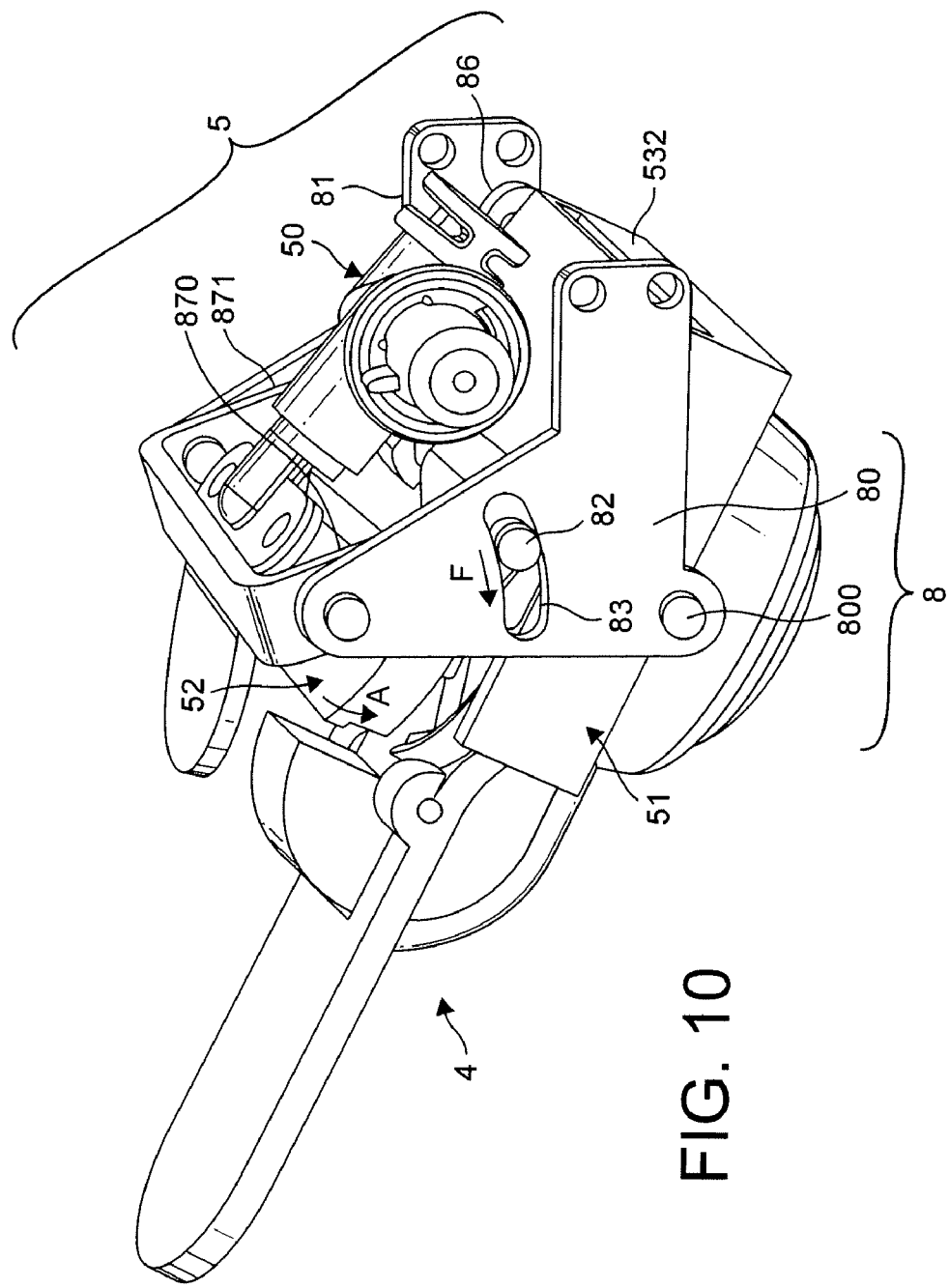
FIG. 10 shows the closure of the fluid supply unit and the connection to the injector.

As shown in FIG. 10, the guide openings 83 are configured so that, when the capsule-holder is brought manually downwards (direction O), the guide base 51 pivots relative to the wings 80, 81 about the shaft 800 and brings the supply base 52 which then closes on the guide base 51 in the direction represented by the arrow A since the shafts 82 are forced to guide into the openings 83 in the direction F. As shown in FIG. 7, the capsule-holder has referencing means in the form of two arc-shaped portions protruding on the bearing edge 43 which are configured to fit into complementary channels of the supply base 52. Therefore, for the supply base to close so that the fluid connection can be performed properly, the capsule-holder must be inserted in along the side edges of the support base up to the reference position. If not sufficiently engaged, the supply base cannot be closed. Of course, the referencing means can take many other equivalent forms, on the capsule-holder and/or fluid supply unit, as long as the referencing function can be achieved.

Figure 9:
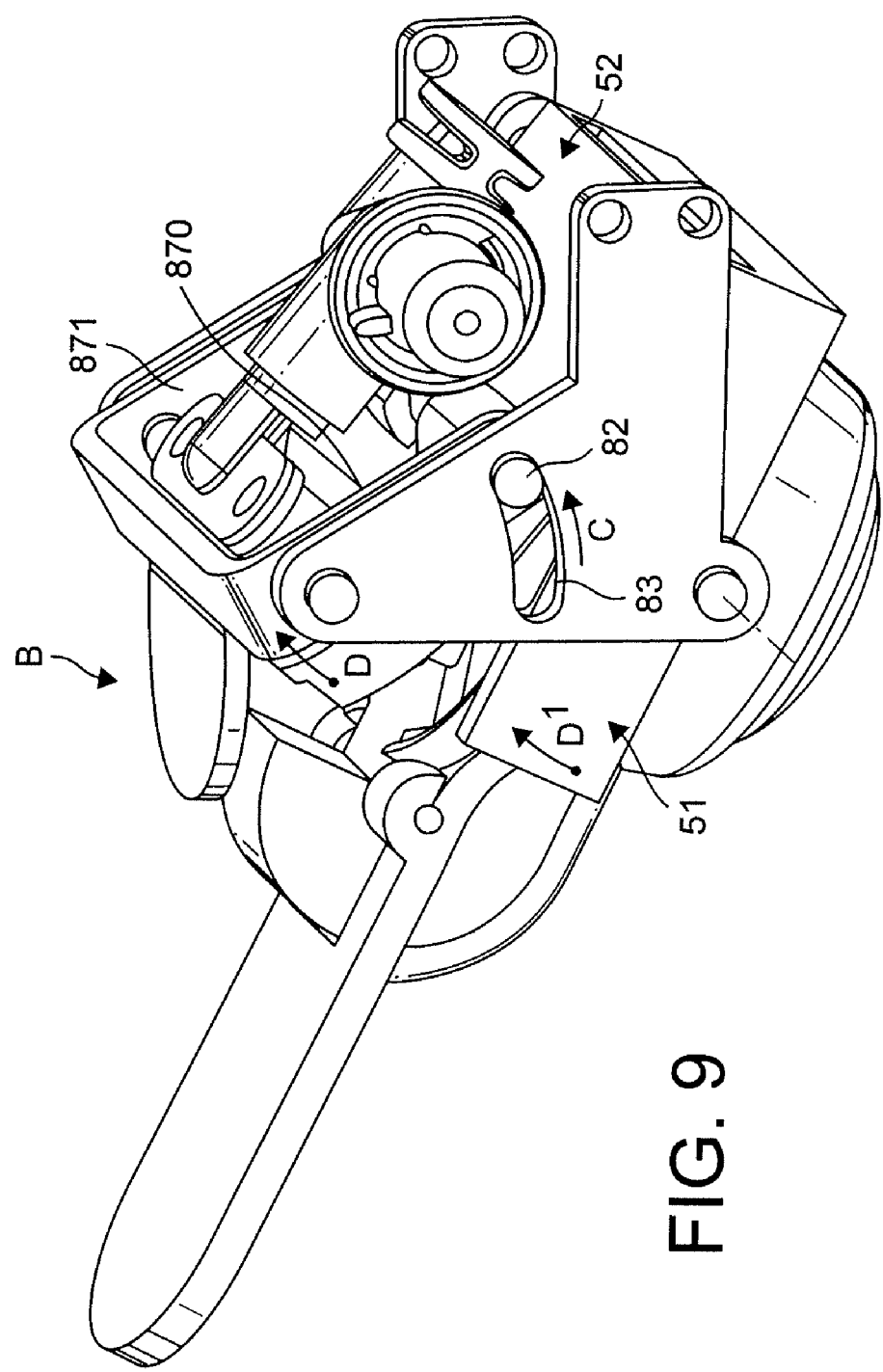
FIG. 9 shows the insertion of the capsule-holder into the fluid supply unit before closure and connection to the injector.

A reopening lever 87 can (optionally) also be provided to make the reopening of the supply unit easier. The lever 87 is in the form of an inverted U-shaped yoke with two side legs 870, 871. The legs 870, 871 are mounted pivotably on the shaft 88 on the top part of the wings 80, 81 and are guided along the articulations 82 into the openings 83. Thus, as shown in FIG. 9, when the lever is activated manually in the direction of the arrow B, particularly downwards, the legs of the yoke pivot about the shaft 88 and bring the articulation 82 in the direction C, rearwards, which has the effect of bringing the supply base 52 upwards (direction D), hence reopening. When the articulation abuts in the opening, it is the guide base 51 that is brought upwards (direction D1) to return to the opening or insertion position of the capsule-holder.

Figure 8:
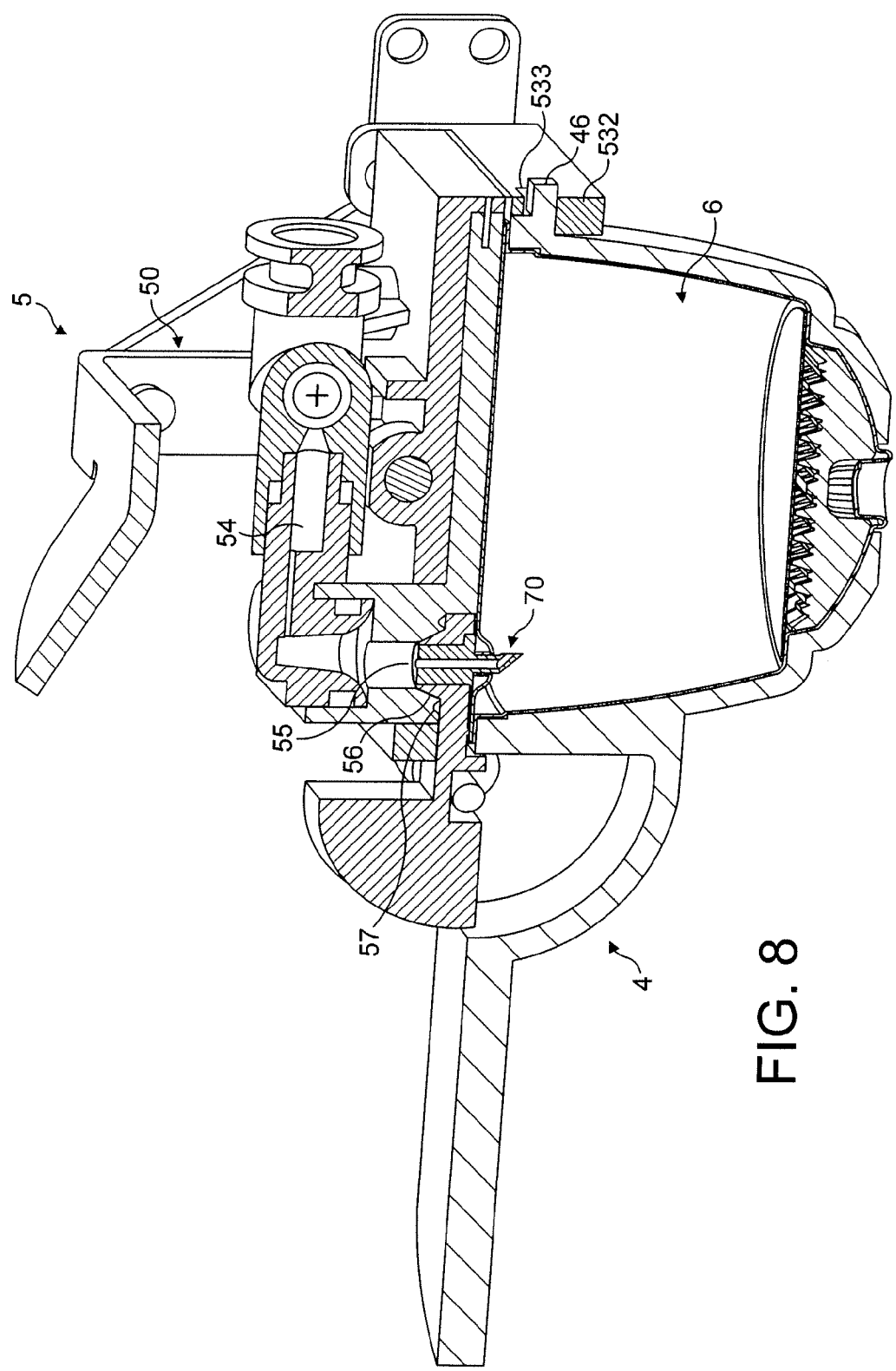
FIG. 8 shows a view in section of the preparation device in the closed position when the supply unit is connected to the injector.

As shown in FIG. 8, in the position of closure of the supply unit 5 against the capsule-holder 4, the fluid connection is established. The fluid supply means of the mobile supply base comprise a fluid connector 50 furnished with an internal duct 54 to transport the fluid to an outlet 55 placed in communication with the inlet orifice 76 of the injector. To promote a connection withstanding high pressures, the connector of the supply unit preferably terminates in a conical portion 56 forming a free cone-on-cone connection with the inlet portion 77 of the injector. A seal 57, such as an O-ring, may be added to ensure a good seal of the connection.

In an alternative, the inlet portion could also be an inverted truncated portion into which can fit a protruding portion such as a portion of tube or truncated portion of the fluid supply means. The truncated portion should be of small volume to reduce the amount of hot residual water when removing the capsule-holder.

Figure 11:
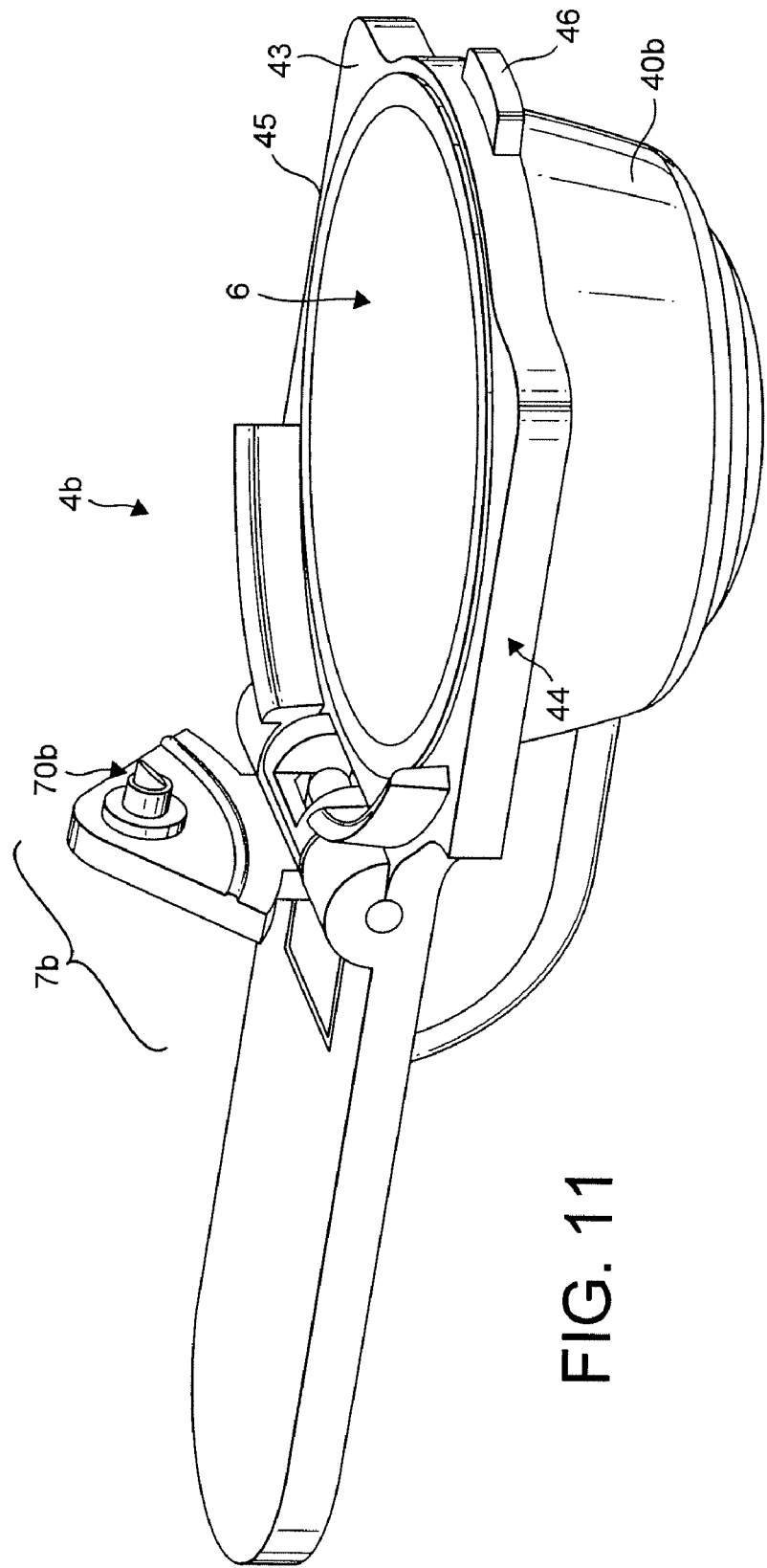
FIG. 11 shows a view in perspective of a variant of the capsule-holder which houses a capsule of a size different from the size of the preceding embodiment.
Figure 12:
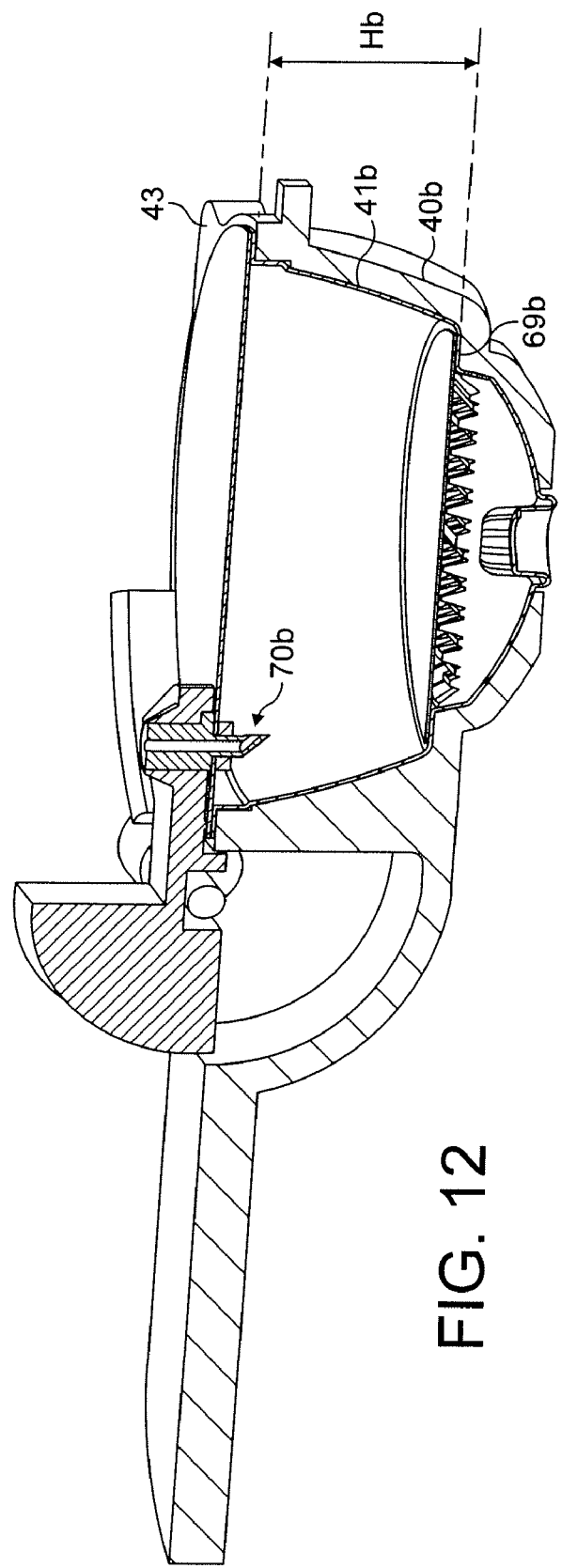
FIG. 12 shows a view in section of the capsule-holder of FIG. 11.
Figure 13:
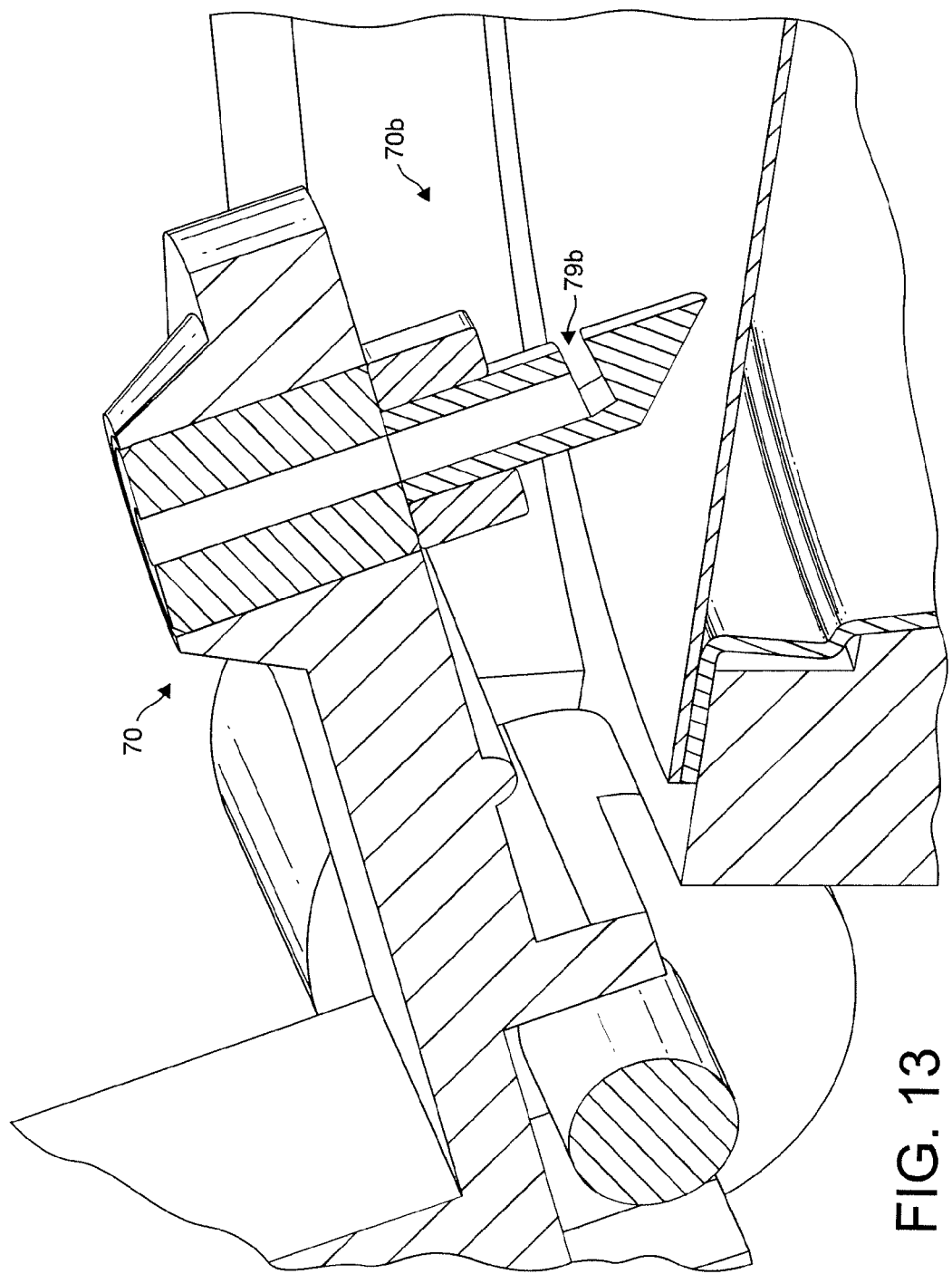
FIG. 13 shows a detail of the capsule-holder injector of FIG. 12.

FIGS. 11 to 13 show another type of capsule-holder 4b according to the invention. This capsule-holder 4b is designed to be inserted into the supply unit 5 thanks to the complementary engagement means 44, 45, 46 which remain identical to the previously described engagement means of the capsule-holder 4. The result is therefore that the capsule-holders 4, 4b are both interchangeable and removable from the supply unit 5.

The capsule-holders 4, 4b however have at least one specific feature that distinguishes them. This feature relates to:

i) the shape and/or the size of the housing to receive the capsule; and/or i) the injection method by which the injector is configured to deliver the fluid into the capsule.

In the example illustrated, the capsule-holder 4b is configured in terms of volume and injection method to receive more particularly capsules containing ingredients requiring a small storage volume and a wetting distributed over the cross section of the bed of substance. The ingredients may be, for example, the grounds of, for example, coffee or tea.

The capsule-holder 4b thus comprises a cup 40b which defines an internal surface or housing 41b whose volume is smaller than the volume of the internal surface or housing 41 of the capsule-holder 4 previously described. In particular, the depth Hb separating the internal bearing edge 69b from the top edge 43 is shorter than the same depth H of the capsule 4. As a result, the capsule-holder receives capsules whose internal ration is thinner, which may be more appropriate for example for extracting espresso or filter coffees from a bed of ground coffee.

On the other hand, the capsule-holder 4 of FIG. 5 has, for its part, a housing 41 whose depth H is greater so that it can receive capsules whose ration volume is greater, which may be more appropriate for storing a larger quantity of ingredients, such as milk powder, and/or for delivering larger volumes of drink, for example, between 110 and 500 ml of liquid.

Another difference of the capsule-holders 4, 4b lies in the injection method. The capsule-holder 4b comprises an injection system 7b operating according to the same principle of insertion into the capsule as the injection system 7 of the capsule 4 but nevertheless with an injector 70b with a different injection configuration. As shown in FIG. 13 in detail, the injector 70b has an outlet orifice 79b which differs in its shape and direction. The shape and orientation of the outlet orifice are thus configured to distribute the fluid in a more dispersed manner, that is to say over a larger surface of the cross section, which improves the wetting of the ingredients and reduces the formation of undesirable preferential paths. The shape of the orifice is preferably a slot partially and transversely intersecting the cylindrical portion of the injector. The direction is also oriented more transversely in the capsule. Thus, because of the shape and orientation, the jet effect may be attenuated and the fluid may pass through the bed of ingredients in order to more evenly wet over the whole cross section of the bed of substance.

It is therefore understandable that the capsule-holders are provided with features suited to the ingredients contained in the capsule and/or the preparation to be delivered. The device therefore provides greater flexibility, ease of adaptation and the possibility of delivering a wider range of drinks or preparations including, for example, drinks such as espresso coffee, filter coffee, instant coffee, milk-based specialties such as cappuccino, latte or else tea, chocolate or else large volume refreshing drinks based on coffee, tea, milk, cocoa, fruit juice, or else special preparations containing nutritional ingredients, for example, product formulas for infants, for sports people, for the sick or for the aged.

Figure 14:
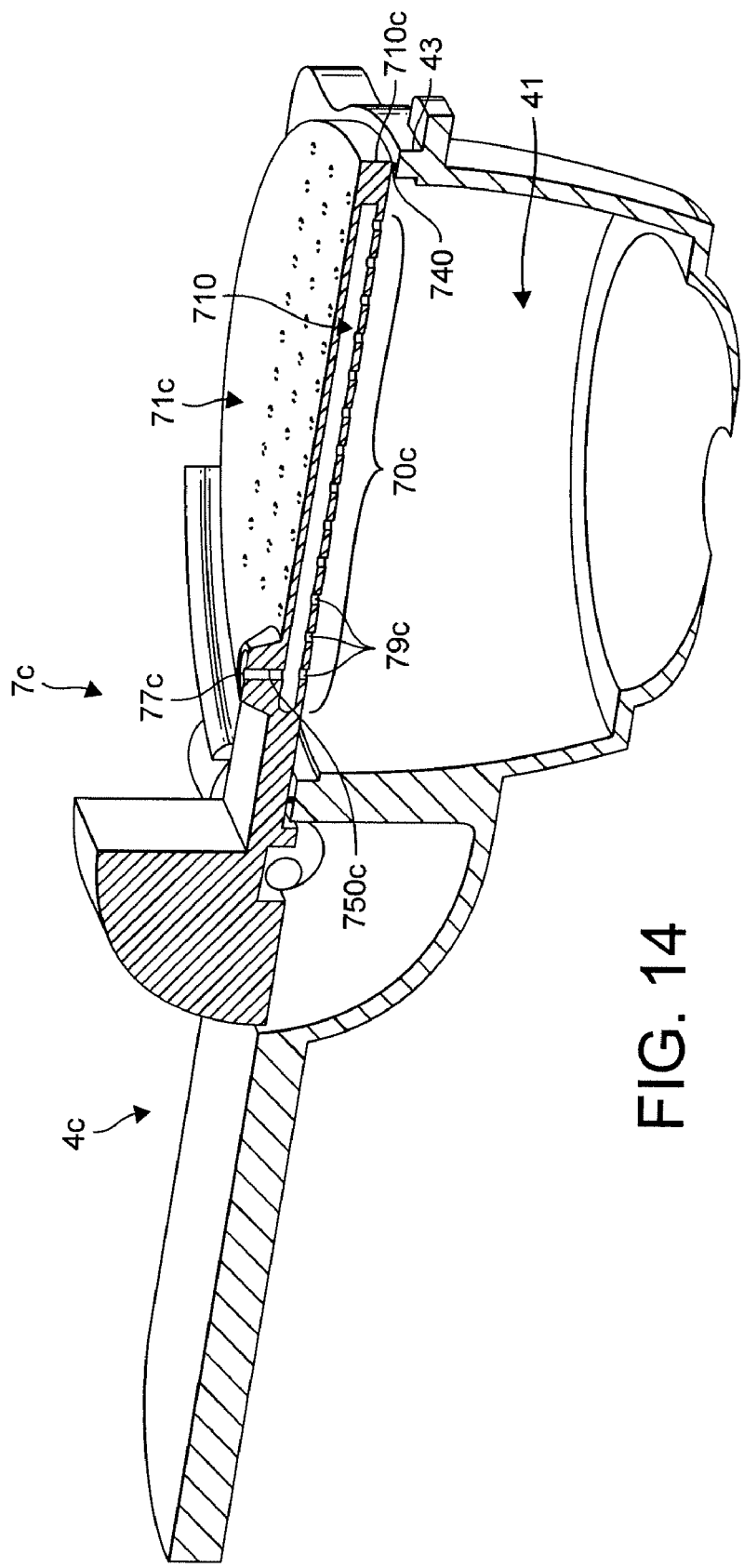
FIG. 14 shows a view in longitudinal section of another variant of a capsule-holder with another type of injector.

FIG. 14 shows a different embodiment of a capsule-holder 4c comprising an injection system 7c that differs from the preceding method. In this case, the injection system 7c comprises an injector 70c in the form of a wall or cover 71c furnished with a fluid manifold or collection chamber 710. This manifold 710 distributes the fluid across a multitude of injection orifices 79c opening into the housing 41 of the capsule-holder. Such a capsule-holder may receive a capsule comprising a top surface permeable to the fluid such as a filter paper, a woven or unwoven textile wall or a grille or simply a capsule open on this side. The fluid is distributed, as in the injector of the preceding embodiments, through an inlet portion 77c, an internal duct 750c opening into the manifold. The injector 70c is sealed from the capsule by means of a seal 740 located at the interface between the edge 710c of the injector and the edge 43 of the capsule-holder. The seal 740 may form part of the injector itself and/or of the capsule-holder and/or of the capsule itself. Such a capsule-holder may thus receive capsules furnished with filtering walls for example. The capsules may be fully flexible and furnished with filtering walls with a peripheral edge for clamping in the capsule-holder.

Figure 15:
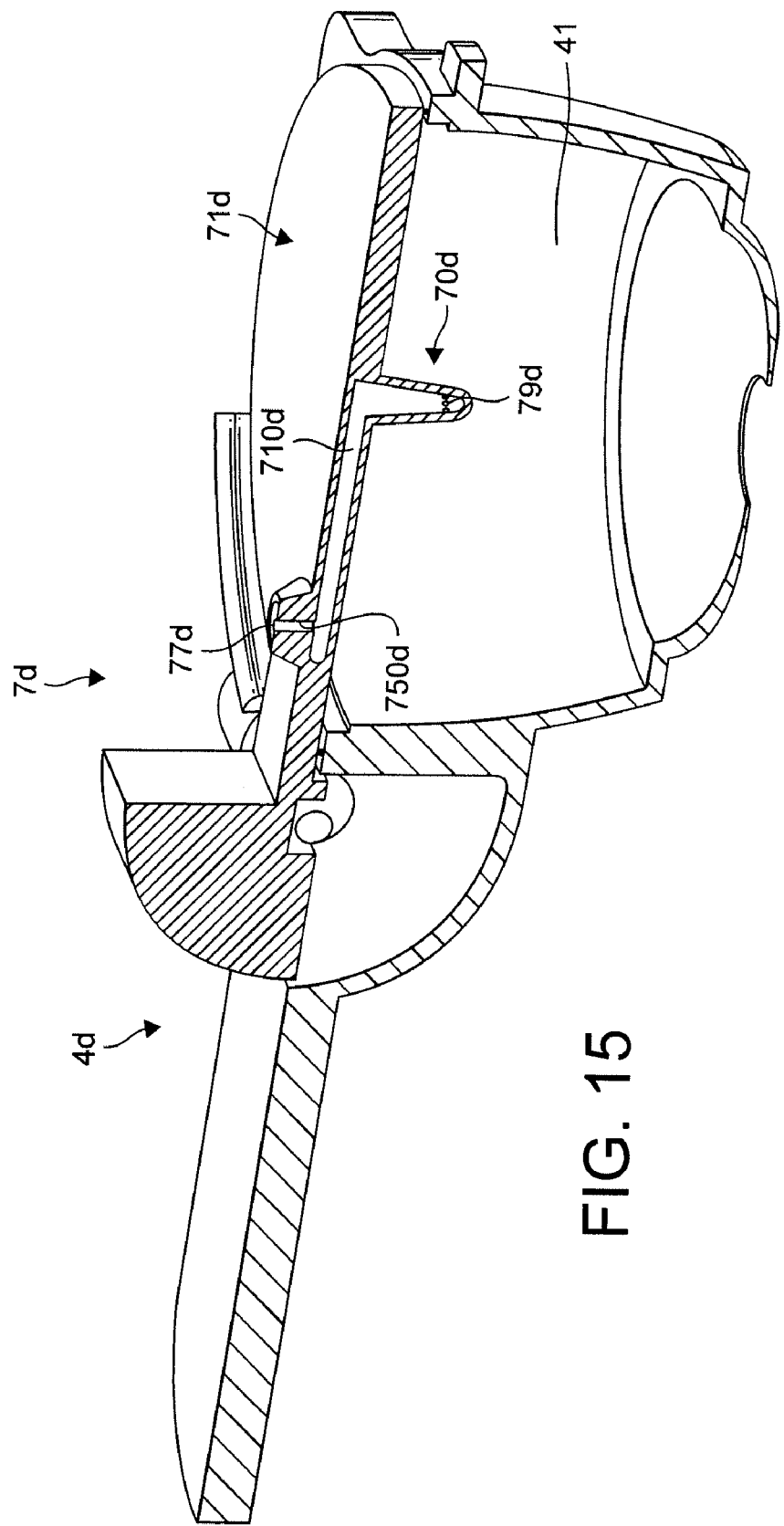
FIG. 15 shows a view in longitudinal section of yet another variant of a capsule-holder with another type of injector.

Another embodiment of a capsule-holder 4d is illustrated in FIG. 15. In this case, the injection system 7d comprises an injector 70d having the form of a central needle made in a plate or cover 71d which extends inside the housing 41 of the capsule-holder. The needle distributes the fluid through injection orifices 79d made in the periphery of the needle. As in the preceding embodiments, the fluid originates from an inlet portion 77d, an internal duct 750d opening into a manifold 710d. The other elements of the injection system remain similar to the other embodiments. Such an arrangement allows the fluid to be distributed radially and at a desired depth in the housing. The needle may be perforating or non-perforating depending on whether the capsule has a wall to be perforated or a wall furnished with an already preformed opening.

Figure 16:
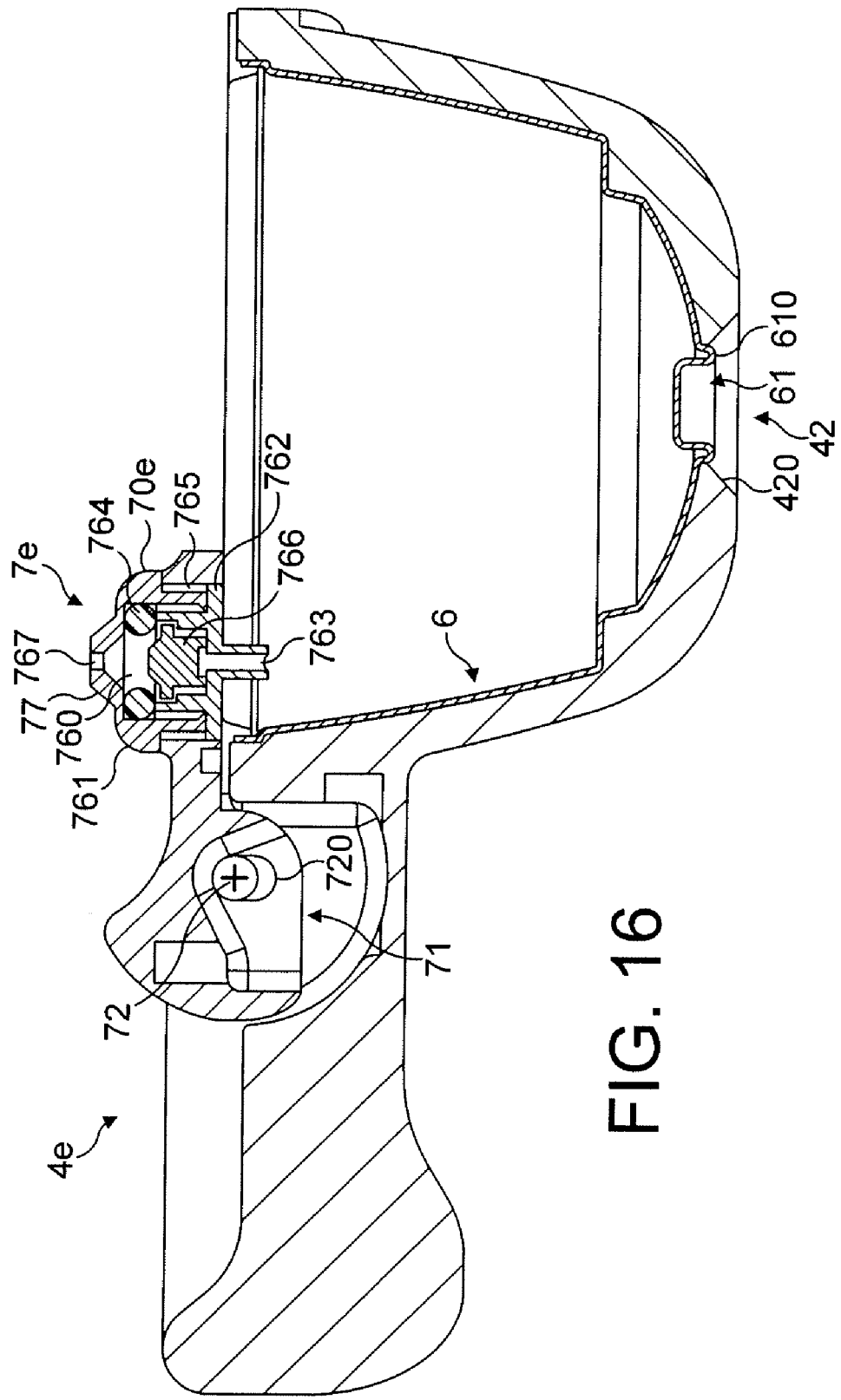
FIG. 16 shows a view in longitudinal section of a capsule-holder according to another variant of the invention.

Another variant of the capsule-holder is illustrated in FIG. 16. The capsule-holder 4e differs from the capsule-holder 4 of FIGS. 3-6 through certain modifications made to the injection system 7e. The system comprises an injector 70e comprising an anti-return valve device. A chamber 760 is provided in the injector by the assembly of a first top piece 761 and a second bottom piece 762 supporting the injection duct 763. The chamber is sealed by an O-ring 764 covering the junction 765 of the assembly portion (for example, a screw thread) between the two pieces. The chamber is closed off by a needle 766 which is pressed by an elastic element such as a helical spring (not shown). When the pressurized fluid enters the chamber, the needle 766 is pushed back, which compresses the spring and opens the inlet 767 of the chamber to allow the fluid to pass through the duct 763 and therefore be inserted into the capsule 6.

Figure 17:
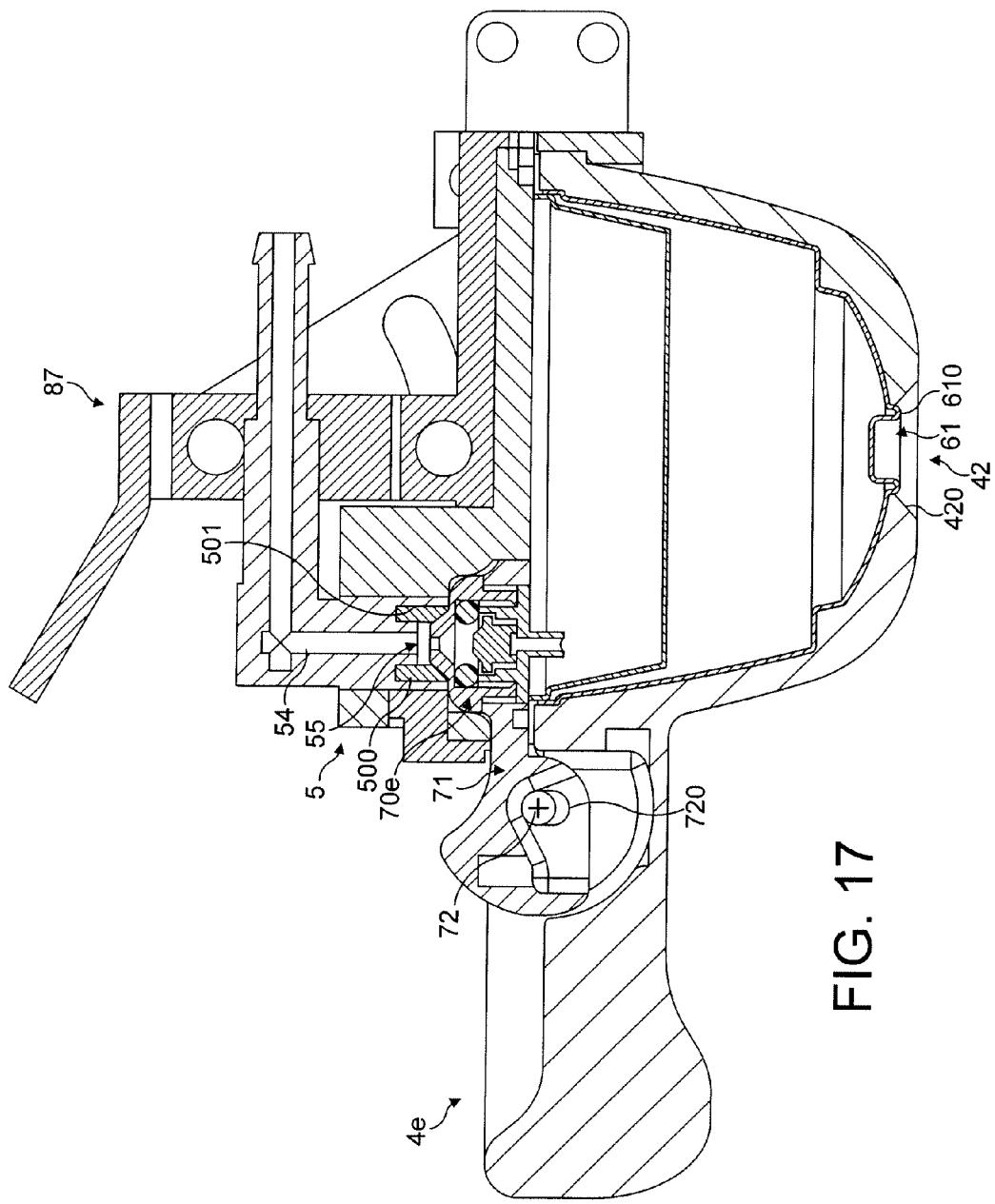
FIG. 17 shows a view in longitudinal section of a device according to a variant with the capsule-holder of FIG. 16 inserted into the supply unit.
Figure 18:
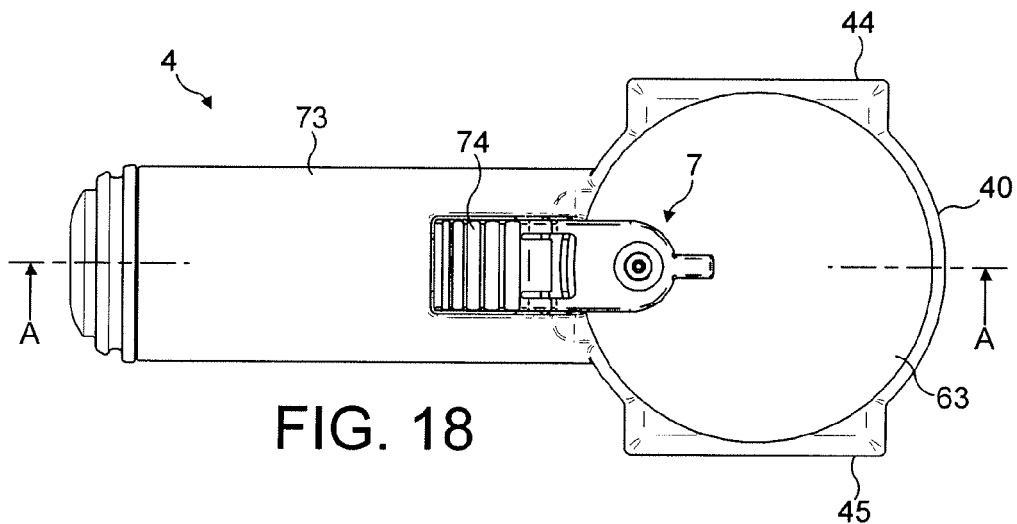
FIG. 18 shows a view from above of another variant of a capsule-holder according to the invention.
Figure 19:
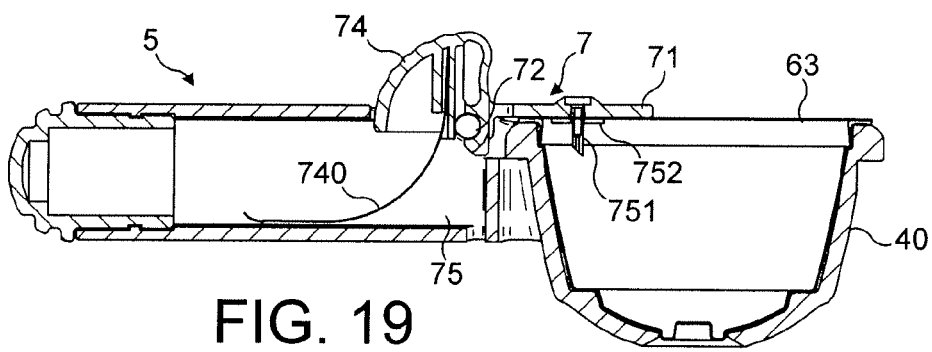
FIG. 19 shows a view in section along A-A of FIG. 18 when the injector is in the position of injection into the capsule.

FIG. 17 shows the connection of the injector 70e in communication against the fluid supply unit 5. The connector of the unit comprises a tubular element 500 made of deformable material which collapses, on simple pressure, against the external conical surface of the connection portion of the injector. The tubular element is inserted into a recess 501 made at the end of the unit's supply duct. The tubular element 500 delimits the fluid outlet 55 of the duct 54 of the unit. It presses on the conical or flared surfaces of the connection portion 77 of the injector and therefore serves both as a bearing and connection surface and as a seal. Such an element may for example be an elastomer or silicone tube whose ends are straight (non-conical) or conical and compress on the connection surface of the injector.

The support piece 71 of the injector is mounted rotatably on an articulation shaft 72 mounted in an opening in order to provide a certain amplitude of vertical movement to allow the support piece a certain clearance in lateral tilting, so that the sealing zone of the injector is positioned more precisely against the inlet wall of the capsule. For this, the support piece is traversed by an oblong opening 720 that is vertically oriented and in which the cross shaft 72 for keeping the piece on the capsule-holder body can tilt. This ensures a better seal of the injection into the capsule. The capsule-holder 4e also has a more ergonomic dish-shaped handle making it easier to hold. The edge 420 of the discharge orifice 42 also has a bevelled cut-away to come away from the edge 610 of the orifice 61 of the capsule in order to prevent contact with the pouring liquid and also to facilitate the discharge of liquid in the event of any contact with the latter.

Figure 20:
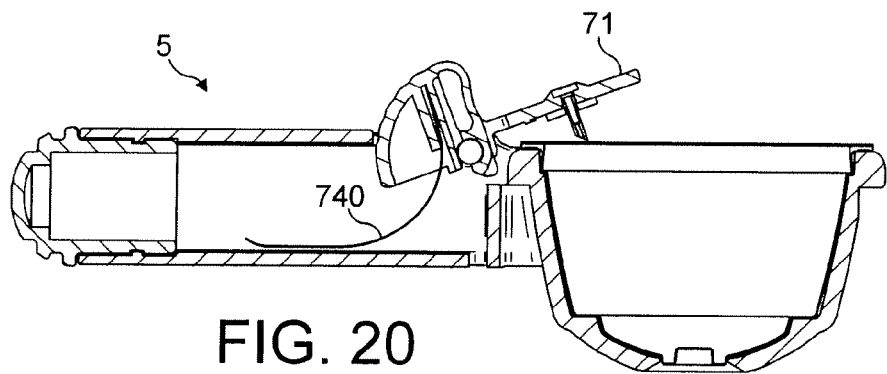
FIG. 20 is a similar view to FIG. 19 but with the injector in the retracted position with respect to the capsule.
Figure 21:
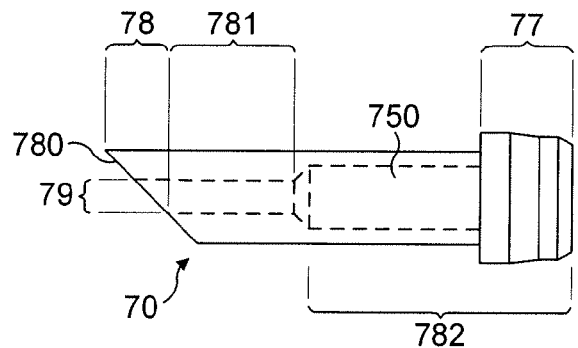
FIG. 21 shows only the injector of FIG. 18 and in side view.
Figure 22:
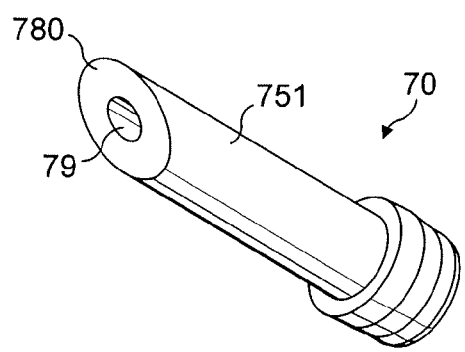
FIG. 22 shows only the injector of FIG. 21, in perspective, showing the injection face.
Figure 23:
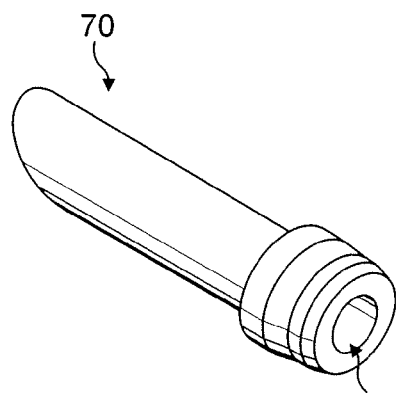
FIG. 23 shows only the injector of FIG. 21, in perspective, showing the face of connection to the supply device.

FIGS. 18 to 23 show another possible embodiment of the capsule-holder and the injector according to the invention. The capsule-holder 4 of FIG. 18 has the same elements as those of the previously described embodiments and the reference numbers are therefore identical to facilitate the identification of the latter. The injection system comprises an actuation means 74 in the form of a pawl used to move the injector 70, from a position of injecting fluid into the capsule (FIG. 19) to a retracted position (FIG. 20). The actuation means 74 moves the support piece or plate 71 on which the injector 70 of FIGS. 21 to 23 is mounted. The movement is made along the rotation shaft 72 situated at the rear of the cup 40 towards the front of the handle 73. An elastic means 740, such as a leaf spring, puts up an elastic resistance to the actuation of the actuation means 74 in order to provide, in the absence of force on the elastic means, the return to the position of injection or of insertion of the injector into the cup. The advantage is to ensure that the injector point is directed towards the cup, which limits the risks of pricking when the capsule-holder has no capsule in it. The elastic means is thus a leaf connected to the actuation means and presses against the recess 75 of the handle. When the elastic means is actuated, the leaf is flexed and its radius of curvature diminishes as is shown in FIG. 20, which accentuates the return forces on the actuation means when the force of the user on the pawl is relaxed. A rigid stepped portion 752 is also provided at the base of the injector to produce a seal by deformation of the upper foil of the capsule. The portion can be made integral with the support 71 by plastic injection and the like.

FIGS. 21 to 23 show a possible embodiment of the injector. In this particular case, the injector has a nozzle 751 in which an internal duct is bored with a rectilinear axis 750 which extends from the inlet orifice 76 to the outlet orifice 79. In other words, the outlet orifice 79 under pressure of the fluid is placed towards the bottom of the cup 40, substantially vertically. Maintenance of the duct is thus made easier. It is easier to unplug the duct when the latter is obstructed by solid particles (scale residues, coffee grains, etc.) than a duct having a bend or a variation of inclination.

The injector nozzle ends in a bevel-shaped cut-away surface 780. At the base of the nozzle 751 a sealing means is provided such as a section enlargement in the form of an annular portion 752 (FIG. 19) made of elastic material, such as elastomer or silicone. The annular portion may be flexible and in the shape of an inverted U or slightly concave to promote its adaptation to the capsule wall when the latter is swollen under the effect of the internal pressure. When the injector is pressed against the top wall of the capsule, the nozzle is then inserted through the wall and the annular portion 752 is pressed against the wall in order to make the seal between the surface of the nozzle thus inserted and the perforation or cut-away hole. The elastic means 740 of the injection system provides the force necessary for a good application of the annular portion 752 against the capsule wall.

The internal duct has at least one portion 781, of small cross section or diameter, performing a function of retaining the fluid in the injector by capillary attraction. The duct is extended in the direction of the inlet orifice by a portion of larger diameter 782. The small cross section internal duct ends in the outlet orifice 79, which also has the effect of producing a powerful jet of fluid into the capsule at the time of the injection. This jet causes a powerful mixing effect in the capsule and helps the soluble substances to dissolve rapidly and completely. The size of the internal diameter of the capillary attraction section is less than 1 mm, preferably less than 0.7 mm, better still of the order of 0.6 to 0.4 mm. The portion of greater diameter 782 downstream is used to ensure that the pressure loss caused by the injector, particularly the portion of reduced section, is not too great. The total loss of pressure of the injector may be of the order of 2 to 5 bar approximately and the pump must be sufficiently powerful to overcome this pressure loss and send the fluid at a boost pressure of approximately 2 to 4 bar. The pump of the supply unit must therefore be chosen to develop a static pressure lying between a minimum of 4 bar, preferably between 5 and 15 bar.

The air seal function caused by the capillary duct is important for preventing the problem of liquid drips or leaks which escape through the bottom of the capsule due to the ingress of air into the injector then into the capsule. To prevent this phenomenon, the portion 781 is therefore designed to remain full of liquid by capillary attraction when the capsule-holder is removed from the rest of the machine. As previously discussed, this capillary duct could be replaced by an anti-return valve or any equivalent means.

Figure 24:
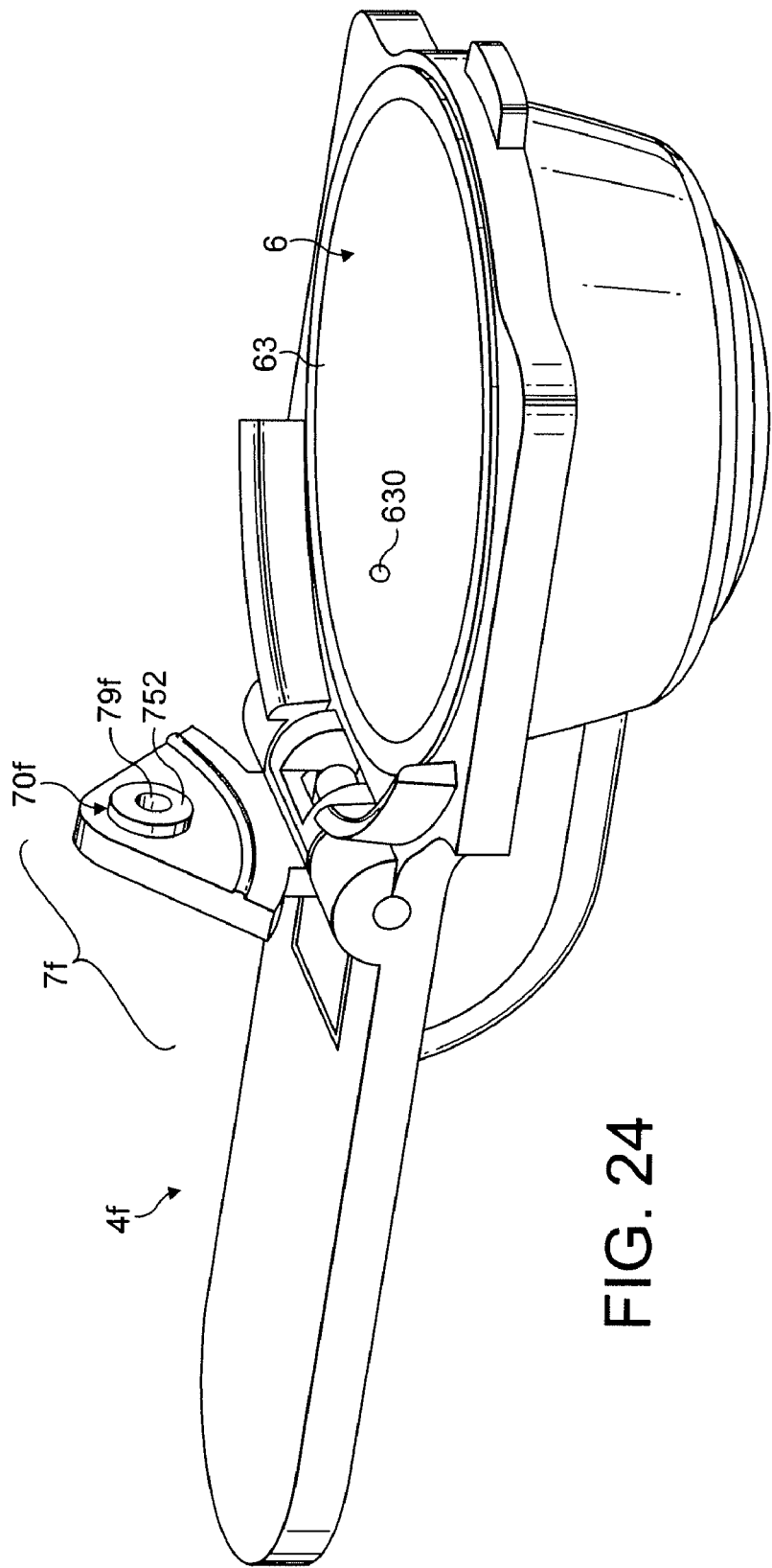
FIG. 24 shows a view of the capsule-holder with a capsule according to another variant of the invention.
Figure 25:
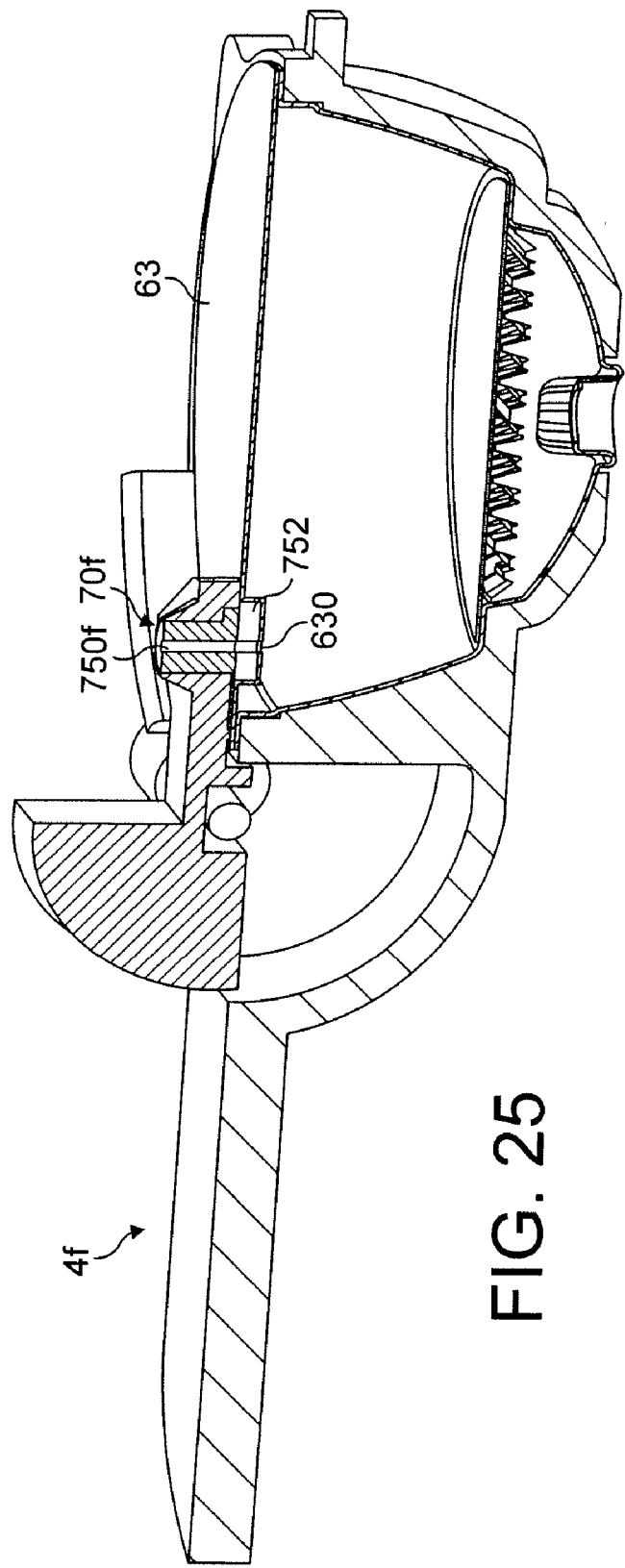
FIG. 25 shows the capsule-holder and its capsule of FIG. 24 in longitudinal section.

FIGS. 24 and 25 show an embodiment in which the injector nozzle is replaced by a simple connector 752 which ends in an orifice 79f. The injector adjusts to the contact of the wall 63 facing an orifice 630 in the capsule. In this case, the orifice preexists and is not pierced by the injector. The connector may be a cylindrical element or of any other shape. The connector may be partially or totally made of elastomer serving as a seal. As shown in FIG. 25, the wall 63 of the capsule may be substantially deformed by the mechanical pressure exerted by the injection device, which ensures a better seal. In an alternative (not shown), the cover is more rigid, therefore less deformable or not deformable at all and it is the connector that compresses against the wall to compensate for the clearances and make the seal. In another possible embodiment, both elements, wall 63 and connector 752, are deformable.

Figure 26:
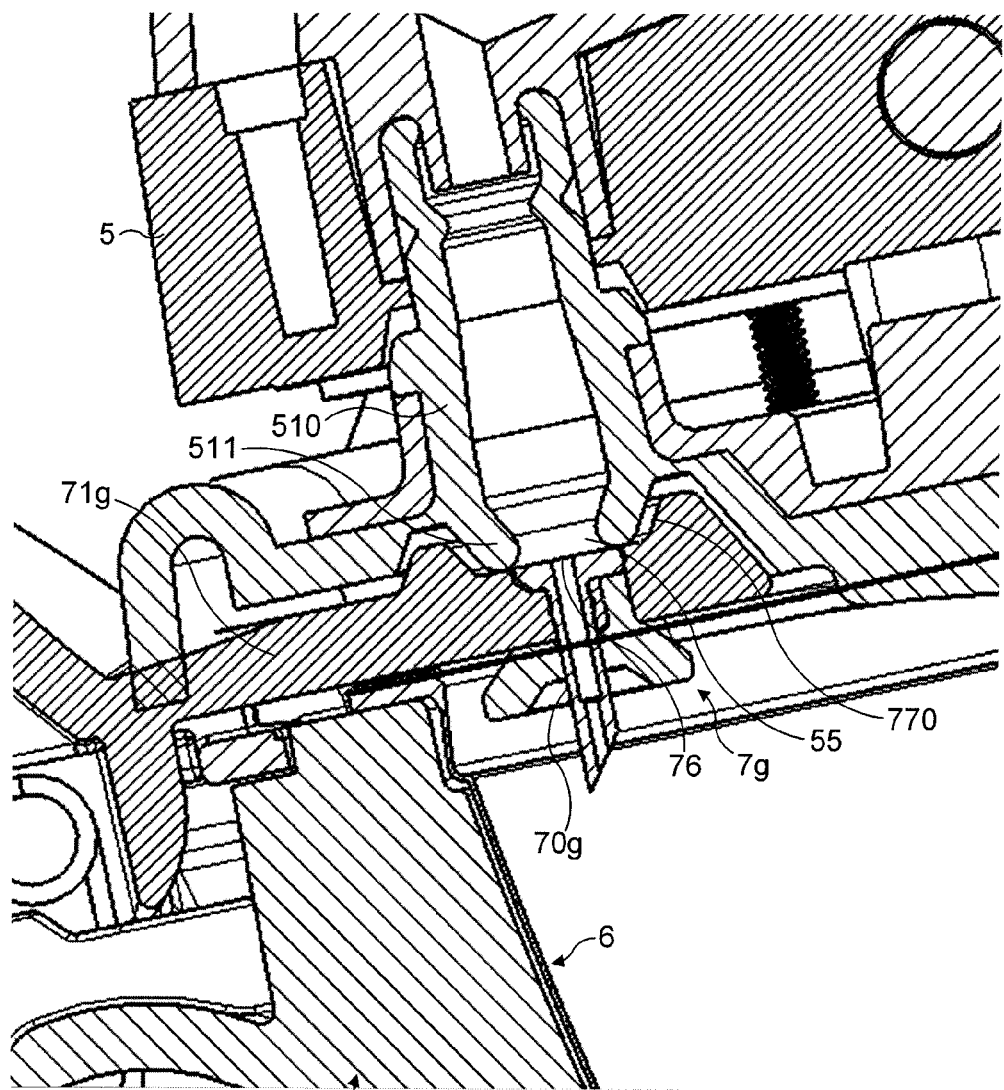
FIG. 26 shows a detail in cross sectional view of the fluid connection between the capsule holder and the fluid supply means according to another variant of the invention.

FIG. 26 illustrates a further variant of the connection between a capsule-holder 4g and a fluid supply unit 5. The connection is carried out by maintaining simple pressure applied by a protruding tubular portion 510 delimiting a fluid outlet 770 of the supply means into a recessed portion 770 of the injector system 7g that delimits a central fluid inlet orifice 76. The necessary fluid tightness is so obtained between the capsule-holder and the fluid supply means by the surface of the tube contacting the surfaces of the recessed portion. The recessed portion and the tube can have complementary trunconical shapes as illustrated to favour the tight contact along a larger surface area. The recessed portion is formed in the support piece 71g of the injector such as by plastic injection or can be an extension of the injector 70g itself. The tubular portion 510 can be made of a deformable resilient material to better match the surfaces of the recessed portion. The trunconical form of the portion end 511 promotes a deflection of the surfaces of contact against the portion 770. The recessed portion 770 is of a small volume with a larger width smaller than about 2 cm and a depth smaller than about 0.5 cm so that little residual water remains inside when the capsule-holder is disconnected from the fluid supply means. The tubular portion 510 can be a removable or permanent piece that is inserted in or overmolded to the upstream part of the fluid supply unit 5. The tubular portion can be made of a resilient heat-resistant rubber elastomer or plastic and the rest of the unit of metal or hard plastic. The injector 70g forms an internal conduit with a final capillary portion of reduced section relatively to the fluid inlet 55.

the invention is of course not limited to just the embodiments described. For example, other embodiments of equivalent capsule-holders can be envisaged depending on the type of capsule or the type of drink to be prepared.

What is claimed is:

1. A device for preparation of a drink from a food substance contained in a capsule comprising:
    a fluid supply unit comprising a fluid supply, a supply base, a fluid outlet and a closing mechanism;
    a capsule holder removably associated with the fluid supply unit and comprising a housing to receive a capsule; and
    complementary engaging members of the fluid supply unit and capsule holder comprising one or more guiding members for enabling insertion of the capsule holder into the fluid supply unit along a first direction of insertion in which the capsule holder is prepositioned in the fluid supply unit in a reference position in which the fluid supply is relatively distant from the capsule holder;
    wherein the closing mechanism is configured to bring the supply base relatively closer to the capsule holder by effect of a force carried out on the capsule holder in a manner such that the supply base becomes positioned in a fluid distribution position for distributing fluid into the capsule.

2. The device according to claim 1, wherein the closing mechanism of the fluid supply unit is configured to bring the supply base relatively closer to the capsule holder in the fluid distributing position by the effect of a force that is directed downwardly.

3. The device according to claim 1, wherein the complementary members of engagement of the capsule holder and fluid supply unit comprise a complementary set of guiding edges and guiding ribs enabling the insertion of the capsule holder by sliding it into the fluid supply unit.

4. The device according to claim 3, wherein the fluid supply unit comprises a guide base into which the capsule holder is inserted by sliding movement along the guiding edges; wherein the supply base is articulated to and mobile relative to the guide base from the distant position to the fluid distribution position of the fluid supply in the capsule.

5. The device according to claim 4, wherein the supply base is articulated to the guide base by a toggle joint system so that pressure on the capsule holder in a preferred direction distinct from the insertion direction causes the supply base to close relative to the guide base in the fluid distribution position.

6. The device according to claim 5, wherein the toggle joint system comprises two wings mounted on two side articulation shafts of the guide base with the wings being also mounted by two articulations on the supply base through two arced oblong guide openings made in the wings; thereby the guide base is pivotable relative to the wings about the shafts when the capsule holder is brought manually downwards and brings the supply base downwards which then closes on the guide base.

7. The device according to claim 1, wherein the capsule holder comprises a fluid injector for inserting fluid within the capsule.

8. The device according to claim 7, wherein the injector comprises a fluid inlet orifice, an injection duct and at least one injection orifice for injecting at least one pressurized jet of fluid into the capsule, wherein the injector comprises a nozzle which perforates, cuts away or inserts itself through a wall of the capsule.

9. The device according to claim 8, wherein the injector comprises a sealing element located at the base of the nozzle or of the connector and made of an elastic material to provide a seal between the nozzle or connector and the wall of the capsule or contribute to provide sealing effect at the surface of the capsule.

10. The device according to claim 9, wherein the sealing member includes a rigid stepped portion around the base of that part of the injector that inserts itself into the capsule, with the portion being effective to provide an impression on the surface of the capsule.

11. The device according to claim 1, wherein the fluid injector is part of the fluid supply unit.

12. A capsule holder for removable connection to a fluid supply unit of a drink preparation device to prepare a drink from a food substance contained in a capsule by inserting a fluid into the capsule, the capsule holder comprising:
 a holding mechanism to hold the capsule, and
 an injection device comprising an injector for connection to the fluid supply unit and configured for transferring fluid from the supply unit into the capsule in the form of at least one jet of fluid, wherein the injector comprises a fluid inlet orifice, an injection duct and at least one injection orifice for injecting at least one pressurized jet of fluid into the capsule.

13. The capsule holder according to claim 12, wherein the fluid supply unit includes a fluid supply duct and the injector comprises a connection portion forming at least one seal bearing surface intended to come to bear against the fluid supply duct, with the seal bearing surface occupying a limited surface area directly above the housing but that is smaller than the surface area of the housing.

14. The capsule holder according to claim 13, wherein the seal bearing surface surrounds a fluid inlet orifice and both the seal bearing surface and the fluid inlet orifice are placed substantially off-centered above the housing.

15. The capsule holder according to claim 13, wherein the seal bearing surface has an external diameter of less than 2 cm and the orifice has a diameter of less than 3 mm, and the at least one bearing surface is frustoconical.

16. The capsule holder according to claim 12, wherein the injector comprises either a nozzle which perforates, cuts away or inserts itself through a wall of the capsule or a connector which is arranged against an orifice of a wall of the capsule in order to send fluid through the orifice under pressure into the capsule.

17. The capsule holder according to claim 16, wherein the injector comprises a sealing element of an elastic material to provide a seal between the nozzle or connector and the wall of the capsule.

18. The capsule holder according to claim 17, wherein the sealing element includes a rigid stepped portion around the base of the part of the injector that inserts itself in the capsule, with the portion being effective to provide an impression on the surface of the capsule.

19. The capsule holder according to claim 12, wherein the injector comprises an injection wall or cover entirely covering the cup and the wall or cover is furnished with a fluid delivery manifold having a multitude of injection orifices and being operatively associated with a central needle furnished in the wall or cover which delivers fluid to the orifices.

20. The capsule holder according to claim 12, wherein the injector is associated with a fluid duct and a mechanism for blocking the duct.

21. The capsule holder according to claim 20, wherein the blocking mechanism is a valve.

22. The capsule holder according to claim 20, wherein the blocking mechanism is a portion of duct of smaller cross section that causes retention of liquid in the duct by capillary attraction.

23. The capsule holder according to claim 20, wherein the injection duct has a rectilinear axis and is oriented vertically toward the bottom of the cup.

24. The capsule holder according to claim 12, which further comprises a guidance mechanism in the form of lateral ribs for the insertion of the capsule holder into the fluid supply unit.

25. A combination comprising a capsule holder according to claim 12 and a capsule containing a food substance for the preparation of a drink with the capsule comprising walls defining an external volume matching the housing of the capsule holder and a lateral edge with dimensions suitable for bearing against a bearing rim of the capsule holder.

26. A device for preparation of different drinks from food substances contained in capsules by injection of a fluid under pressure into the capsules, comprising a fluid supply unit and a fluid injector, the device comprising a series of capsule holders which are interchangeable and removable with respect to the fluid supply unit, with each capsule holder comprising specific features that distinguish each other capsule holder chosen amongst the shape, size, fluid injection arrangement and combinations thereof.

* * * * *

UNITED STATES PATENT AND TRADEMARK OFFICE
CERTIFICATE OF CORRECTION

PATENT NO.         : 7,469,628 B2                                              Page 1 of 1
APPLICATION NO. : 11/828774
DATED              : December 30, 2008
INVENTOR(S)        : Mandralis et al.

It is certified that error appears in the above-identified patent and that said Letters Patent is hereby corrected as shown below:

<u>Title Page</u>

Before Item (51), insert the following:

-- (30) Foreign Application Priority Data
Feb. 7, 2005    (EP) ………………….. 05100839.9
Jun. 9, 2005    (EP) ………………….. 05105037.5 --

Signed and Sealed this

Twenty-fourth Day of February, 2009

JOHN DOLL
*Acting Director of the United States Patent and Trademark Office*